US007957762B2

(12) United States Patent
Herz et al.

(10) Patent No.: US 7,957,762 B2
(45) Date of Patent: Jun. 7, 2011

(54) USING AMBIENT LIGHT SENSOR TO AUGMENT PROXIMITY SENSOR OUTPUT

(75) Inventors: Scott M. Herz, Santa Clara, CA (US); Roberto G. Yepez, San Francisco, CA (US); Wayne C. Westerman, San Francisco, CA (US); Steven P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 11/620,702

(22) Filed: Jan. 7, 2007

(65) Prior Publication Data
US 2008/0167834 A1 Jul. 10, 2008

(51) Int. Cl.
*H04B 7/00* (2006.01)
*H04B 17/00* (2006.01)
*H04B 1/38* (2006.01)
*H04M 1/00* (2006.01)

(52) U.S. Cl. .................. 455/550.1; 455/41.2; 455/66.1; 455/67.11; 455/90.1; 455/575.1

(58) Field of Classification Search ........ 455/41.1–41.3, 455/550.1, 566, 66.1, 67.11, 90.1, 456.1, 455/575.1; 340/686.6
See application file for complete search history.

(56) References Cited

U.S. PATENT DOCUMENTS

| 5,103,085 | A | 4/1992 | Zimmerman |
| 5,270,818 | A | 12/1993 | Ottenstein |
| 5,406,305 | A | 4/1995 | Shimomura et al. |
| 5,528,266 | A | 6/1996 | Arbeitman et al. |
| 5,684,294 | A * | 11/1997 | Kouhi ..................... 250/214 AL |
| 5,884,156 | A | 3/1999 | Gordon |
| 5,952,992 | A | 9/1999 | Helms |
| 6,208,854 | B1 | 3/2001 | Roberts et al. |
| 6,246,862 | B1 | 6/2001 | Grivas et al. |
| 6,289,453 | B1 | 9/2001 | Walker et al. |

(Continued)

FOREIGN PATENT DOCUMENTS

EP  0992969  4/2000

(Continued)

OTHER PUBLICATIONS

Agilent Technologies Inc., "Agilent unveils optical proximity sensor for mobile appliances", http:/www.embeddedstar.com/press/content/2004/8/embedded16015.html, (Aug. 31, 2004),2 pages.

(Continued)

*Primary Examiner* — Simon D Nguyen
(74) *Attorney, Agent, or Firm* — Blakely, Sokoloff, Taylor & Zafman LLP

(57) ABSTRACT

Apparatuses and methods to sense proximity of an object and operate a proximity sensor of a portable device. In some embodiments, a method includes receiving an ambient light sensor (ALS) output, and altering, based on the ALS output, an effect of a proximity sensor output on control of a proximity determination. The ALS sensor and the proximity sensor may be located adjacent to an earpiece of a portable device. In some cases, the proximity determination may be a proximity of an object to the proximity sensor, and altering the effect may include changing the proximity of the object from a proximity greater than a first threshold to a proximity less than the first threshold. Other apparatuses and methods and data processing systems and machine readable media are also described.

24 Claims, 14 Drawing Sheets

U.S. PATENT DOCUMENTS

| | | | |
|---|---|---|---|
| 6,373,612 B1 | 4/2002 | Hoffman et al. | |
| 6,477,374 B1 | 11/2002 | Shaffer et al. | |
| 6,520,013 B1 | 2/2003 | Wehrenberg | |
| 6,522,697 B1 | 2/2003 | Spickermann | |
| 6,583,676 B2 | 6/2003 | Krah et al. | |
| 6,601,012 B1 | 7/2003 | Horvitz et al. | |
| 6,664,744 B2 | 12/2003 | Dietz | |
| 6,803,920 B2 | 10/2004 | Gossett et al. | |
| 6,812,466 B2 | 11/2004 | O'Connor et al. | |
| 6,822,635 B2 | 11/2004 | Shahoian et al. | |
| 6,947,017 B1 | 9/2005 | Gettemy | |
| 6,947,571 B1 | 9/2005 | Rhoads et al. | |
| 6,956,564 B1 | 10/2005 | Williams | |
| 7,016,705 B2* | 3/2006 | Bahl et al. | 455/566 |
| 7,019,622 B2 | 3/2006 | Orr et al. | |
| 7,117,021 B2 | 10/2006 | Shearer et al. | |
| 7,117,380 B2 | 10/2006 | Kangas | |
| 7,171,221 B1 | 1/2007 | Amin et al. | |
| 7,522,065 B2* | 4/2009 | Falcon | 340/686.6 |
| 7,605,693 B2 | 10/2009 | Kulas | |
| 7,633,076 B2* | 12/2009 | Huppi et al. | 250/559.36 |
| 2001/0031633 A1 | 10/2001 | Tuomela et al. | |
| 2002/0065099 A1 | 5/2002 | Bjorndahl | |
| 2002/0167488 A1 | 11/2002 | Hinckley et al. | |
| 2003/0022666 A1 | 1/2003 | Sato | |
| 2003/0095096 A1 | 5/2003 | Robbin et al. | |
| 2003/0108300 A1 | 6/2003 | Walker et al. | |
| 2003/0224726 A1 | 12/2003 | Shearer et al. | |
| 2004/0012556 A1 | 1/2004 | Yong et al. | |
| 2004/0110472 A1 | 6/2004 | Witkowski et al. | |
| 2004/0180649 A1 | 9/2004 | Vogel et al. | |
| 2004/0203351 A1 | 10/2004 | Shearer et al. | |
| 2004/0224638 A1 | 11/2004 | Fadell et al. | |
| 2004/0233153 A1 | 11/2004 | Robinson | |
| 2004/0245438 A1 | 12/2004 | Payne et al. | |
| 2005/0132416 A1 | 6/2005 | Wasilewski | |
| 2005/0168658 A1 | 8/2005 | Woolgar et al. | |
| 2005/0190142 A1 | 9/2005 | Ferguson | |
| 2005/0219223 A1 | 10/2005 | Kotzin et al. | |
| 2005/0219228 A1 | 10/2005 | Alameh et al. | |
| 2005/0219394 A1 | 10/2005 | Du et al. | |
| 2005/0221791 A1* | 10/2005 | Angelhag | 455/343.5 |
| 2006/0017692 A1 | 1/2006 | Wehrenberg et al. | |
| 2006/0026521 A1 | 2/2006 | Hotelling et al. | |
| 2006/0026535 A1 | 2/2006 | Hotelling et al. | |
| 2006/0060762 A1* | 3/2006 | Chan et al. | 250/221 |
| 2006/0087245 A1 | 4/2006 | Ng et al. | |
| 2006/0097991 A1 | 5/2006 | Hotelling et al. | |
| 2006/0116175 A1 | 6/2006 | Chu | |
| 2006/0117108 A1 | 6/2006 | Salisbury et al. | |
| 2006/0146012 A1 | 7/2006 | Arneson et al. | |
| 2006/0161870 A1 | 7/2006 | Hotelling et al. | |
| 2006/0161871 A1 | 7/2006 | Hotelling et al. | |
| 2006/0164241 A1 | 7/2006 | Makela et al. | |
| 2006/0199536 A1 | 9/2006 | Eisenbach | |
| 2006/0290921 A1 | 12/2006 | Hotelling | |
| 2007/0046629 A1 | 3/2007 | Chi-Boon et al. | |
| 2007/0057773 A1 | 3/2007 | Hsieh et al. | |
| 2007/0075965 A1 | 4/2007 | Huppi et al. | |
| 2007/0085157 A1 | 4/2007 | Fadell et al. | |
| 2007/0099574 A1* | 5/2007 | Wang | 455/67.11 |
| 2007/0135091 A1 | 6/2007 | Wassingbo | |
| 2007/0161410 A1 | 7/2007 | Huang et al. | |
| 2007/0225047 A1 | 9/2007 | Bakos | |
| 2007/0233759 A1 | 10/2007 | Tomlinson et al. | |
| 2007/0239903 A1 | 10/2007 | Bhardwaj et al. | |
| 2007/0266185 A1 | 11/2007 | Goddi et al. | |
| 2007/0293188 A1* | 12/2007 | Houghton et al. | 455/404.2 |
| 2008/0006762 A1 | 1/2008 | Fadell et al. | |
| 2008/0090617 A1* | 4/2008 | Sutardja | 455/566 |
| 2008/0102882 A1 | 5/2008 | Sutardja | |
| 2008/0113618 A1* | 5/2008 | De Leon et al. | 455/41.2 |
| 2008/0192129 A1 | 8/2008 | Walker et al. | |
| 2009/0047904 A1 | 2/2009 | Preston et al. | |
| 2009/0244092 A1 | 10/2009 | Hotelling | |
| 2009/0313473 A1 | 12/2009 | Walker et al. | |

FOREIGN PATENT DOCUMENTS

| | | |
|---|---|---|
| EP | 1185058 | 3/2002 |
| EP | 1335430 | 8/2003 |
| EP | 1355223 | 10/2003 |
| EP | 1452988 | 9/2004 |
| EP | 1507132 | 2/2005 |
| EP | 1507196 | 2/2005 |
| EP | 1650938 | 4/2006 |
| EP | 1696414 | 8/2006 |
| GB | 2346500 | 8/2000 |
| GB | 2418808 | 4/2006 |
| JP | 05-323277 | 12/1993 |
| JP | 2007-163872 | 6/2007 |
| WO | WO-2004/093045 | 10/2004 |
| WO | WO-2005/101176 | 10/2005 |

OTHER PUBLICATIONS

Apple Inc., "PCT Notification of Transmittal of the International Search Report and the Written Opinion of the International Searching Authority", PCT/US2007/022335, (Feb. 18, 2008).

CNET NEWS.COM, "Reinventing the Scroll Wheel", Photo 1, http://news.com/2300-1041_3-6107951-1.html?tag=ne.gall.pg, (Aug. 22, 2006),2 pages.

CNET NEWS.COM, "Reinventing the Scroll Wheel", Photo 2, http://news.com/2300-1041_3-6107951-2.html?tag=ne.gall.pg, (Aug. 22, 2006),2 pages.

CNET NEWS.COM, "Reinventing the Scroll Wheel", Photo 3, http://news.com/2300-1041_3-6107951-3.html?tag=ne.gall.pg, (Aug. 22, 2006),2 pages.

CNET NEWS.COM, "Reinventing the Scroll Wheel", Photo 4, http://news.com/2300-1041_3-6107951-4.html?tag=ne.gall.pg, (Aug. 22, 2006),2 pages.

CNET NEWS.COM, "Reinventing the Scroll Wheel", Photo 5, http://news.com/2300-1041_3-6107951-5.html?tag=ne.gall.pg, (Aug. 22, 2006),2 pages.

CNET NEWS.COM, "Reinventing the Scroll Wheel", Photo 6, http://news.com/2300-1041_3-6107951-6.html?tag=ne.gall.pg, (Aug. 22, 2006),2 pages.

CNET NEWS.COM, "Reinventing the Scroll Wheel", Photo 7, http://news.com/2300-1041_3-6107951-7.html?tag=ne.gall.pg, (Aug. 22, 2006),2 pages.

CNET NEWS.COM, "Reinventing the Scroll Wheel", Photo 8, http://news.com/2300-1041_3-6107951-8.html?tag=ne.gall.pg, (Aug. 22, 2006),2 pages.

Kennedy, "Methods and Apparatuses for Configuration Automation", U.S. Appl. No. 10/805,144, 59 pages.

Roos, Gina "Agilent's new proximity sensor beats the fumble-fingered competition hands down . . . literally", eeProductCenter, URL:http://www.eeproductcenter.com/showArticle.jhtml?articleID_46200544, (Sep. 1, 2004),3 pages.

Universal Remote Control, Inc., "MX-950 (The Aurora)", www.unversalremote.com, (2005).

Universal Remote Control, Inc., "All Complete Control Remotes Now Use Narrow Band RF", http://www.universalremote.com/corporate/press_release.php?press=13, (2008).

Universal Remote Control, Inc., "Operating System with the Aurora MX-950", MX-950 Owners Manual, (2005).

Apple Inc., "PCT Search Report and Written Opinion mailed Jun. 3, 2008, PCT Appln. No. PCT/US2007/026164.

Apple Inc., "PCT Search Report and Written Opinion mailed Jul. 3, 2008", PCT/US2007/023124, 14 pages.

*PCT Search Report* mailed Aug. 21, 2008; PCT/US2007/026130.

"Apple Inc.", *International Preliminary Report on Patentability* mailed May 28, 2009; PCT Applicaiotn No. PCT/US2007/023124.

"Apple Inc.", *International Preliminary Report on Patentability* mailed May 7, 2009; PCT Application No. PCT/US2007/022335.

"Apple Inc.", *International Preliminary Report on Patentability* mailed Jul. 16, 2009; PCT Application No. PCT/US2007/026164.

"Apple Inc.", *International Preliminary Report on Patentability* mailed Jul. 16, 2009; PCT Application No. PCT/US2007/026141.

"Proximity Sensor Demo Kit User Guide, Version 0.62-Preliminary", *Integration Associates, Inc.*; 2004, 17 pages.

Apple Inc., *International Preliminary Report on Patentability* mailed Jul. 16, 2009; PCT Application No. PCT/US2007/026130.

*Non Final Office Action* mailed Mar. 22, 2010; U.S. Appl. No. 11/638,251.

Apple Inc., *Non Final Office Action* dated May 18, 2010; U.S. Appl. No. 11/871,725.

Apple Inc., *Non Final Office Action* dated May 24, 2010; U.S. Appl. No. 11/650,014.

Apple Inc., *Non Final Office Action* dated Oct. 27, 2010 for U.S. Appl. No. 11/871,725.

Apple Inc., *Final Rejection* mailed Nov. 15, 2010; U.S. Appl. No. 11/650,014.

Apple Inc., *Non Final Rejection* mailed Nov. 15, 2010; U.S. Appl. No. 11/770,614.

Apple Inc., *Non Final Office Action* dated Sep. 29, 2009; U.S. Appl. No. 11/638,251.

* cited by examiner

USING AMBIENT LIGHT SENSOR TO AUGMENT PROXIMITY SENSOR OUTPUT

FIELD OF THE INVENTION

This invention relates to the field of portable devices and, in particular, to systems and methods for detecting proximity of an object.

BACKGROUND OF THE INVENTION

Portable devices, such as cell phones, are becoming increasingly common. These portable devices have grown more complex over time, incorporating many features including, for example, MP3 player capabilities, web browsing capabilities, capabilities of personal digital assistants (PDAs) and the like.

The battery life of these portable devices, however, can be limited. Often, the primary draw of battery power is the display device for these portable devices and, in particular, the backlight, which can be used to illuminate the display device. Thus, operation of these devices can be hampered by not turning off the backlight when it is not needed, such as when the device is held next to or against to the users head. Similarly, these devices can be hampered by performing unintended functions as a result of processing multiple unintentional inputs at an input device that contact a user's face or head.

Some of these portable devices may also include multiple sensors which are used to detect the environment or context associated with these portable devices. For example, U.S. patent application publication no. 2005/0219228 describes a device which includes many sensors, including a proximity sensor and a light sensor. The outputs from the sensors are processed to determine a device environment or context. The light sensor detects ambient light levels and the proximity sensor detects a proximity to an object, such as a user's ear or face.

This is shown in FIG. 1, which shows a device 10. The device 10 includes a proximity sensor 12 mounted on a surface of the device 10 and an ambient light sensor 14 also mounted on the surface of the device 10, such as near an earpiece or speaker. During operation, sensor 12 emits light having known characteristics (e.g., frequency, wavelength, and/or waveform) and detects the emitted light. A portion of the emitted light from sensor 12 hits an object and is reflected by the object, when the object is present above sensor 12. A portion of the reflected light is then received or detected by sensor 12 to determine the proximity of the object to sensor 12. However depending on the types, color, surface shape, and surface textures of materials of the object, the portion of reflected light can vary widely causing large differences in proximity sensor proximity determinations for objects at the same distance from sensor 12.

SUMMARY OF THE DESCRIPTION

The various apparatuses, software and methods described herein relate to sensing proximity of an object and operating a proximity sensor or portable device of an apparatus which receives a proximity sensor output and an ambient light sensor output, and to systems, such as data processing systems, which use software which (automatically or not) changes a proximity setting of a portable device according to the ambient light sensor output.

According to some embodiments of the inventions, a method of sensing proximity includes receiving an ambient light sensor (ALS) output (level); and altering, (automatically or not) based on the ALS output, an effect of a proximity sensor output on control of a proximity determination. Also, the ALS output may be a visible light level of ambient light received by an ALS sensor adjacent to a proximity sensor that provides the proximity sensor output, and the ALS sensor and the proximity sensor may be located adjacent to an earpiece of a portable device. In some cases, the proximity determination may be a proximity of an object to the proximity sensor, and altering the effect may include changing the proximity of the object from a proximity greater than a first threshold to a proximity less than the first threshold. Moreover, the proximity sensor output may be a power level or a rate of change of a power level of emitted IR light reflected by an object and received by the proximity sensor. Similarly, the ALS output may be a power level or a rate of change of ambient light incident upon the sensor. Changes in the ALS output may occur simultaneously with changes in the proximity sensor output. It is also considered that the ALS level may be a change in ALS level and cause the proximity determination to change. In some embodiments, a backlight of a display may be turned off and/or processing of inputs received at an input device may be disabled, (automatically or not), based on the proximity determination. In addition to the ALS output, according to embodiments, the effect of the proximity sensor output on the proximity determination may also be altered, (automatically or not) based on a received accelerometer output and/or a blob detect output.

According to some embodiments a method of operating a portable device may include receiving an ambient light sensor level; and (automatically or not) altering a proximity determination based on the ambient light sensor level.

Finally, according to some embodiments, a method of operating a portable device may include receiving an ambient light sensor level; and (automatically or not) altering a proximity determination based on the ambient light sensor level.

Other apparatuses, data processing systems, methods and machine readable media are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
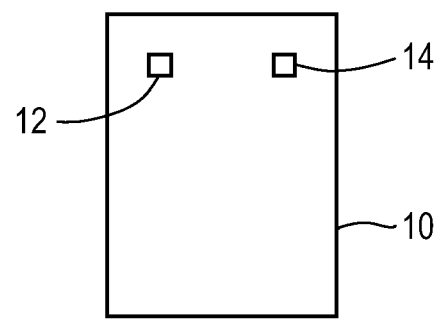
FIG. 1 shows an example of a prior art device which includes two separate sensors.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, processed, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving" or "altering" or "processing" or "computing" or "calculating" or "determining" or "displaying" or the like, can refer to the action and processes of a data processing device or system, or similar electronic device, that manipulates and transforms data represented as physical (electronic) quantities within the system's registers, storage devices, and memories into other data similarly represented as physical quantities within the system's memories, storage devices, or registers or other such information storage, transmission or display devices.

The present invention can relate to an apparatus for performing one or more of the acts or operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), flash memory, erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the present inventions include one or more sensors to monitor user activity. At least certain embodiments of the present inventions also include a method and/or software to (automatically or not) change an effect of a proximity sensor output on control of a proximity determination based on an ambient light sensor (ALS) output (level). The altered proximity determination may more accurately determine actual proximity, such as, for example, to automatically activating or deactivating a backlight of a display device of the portable device or setting an input device of the portable device to a particular state, based on certain predetermined user activities.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 2:
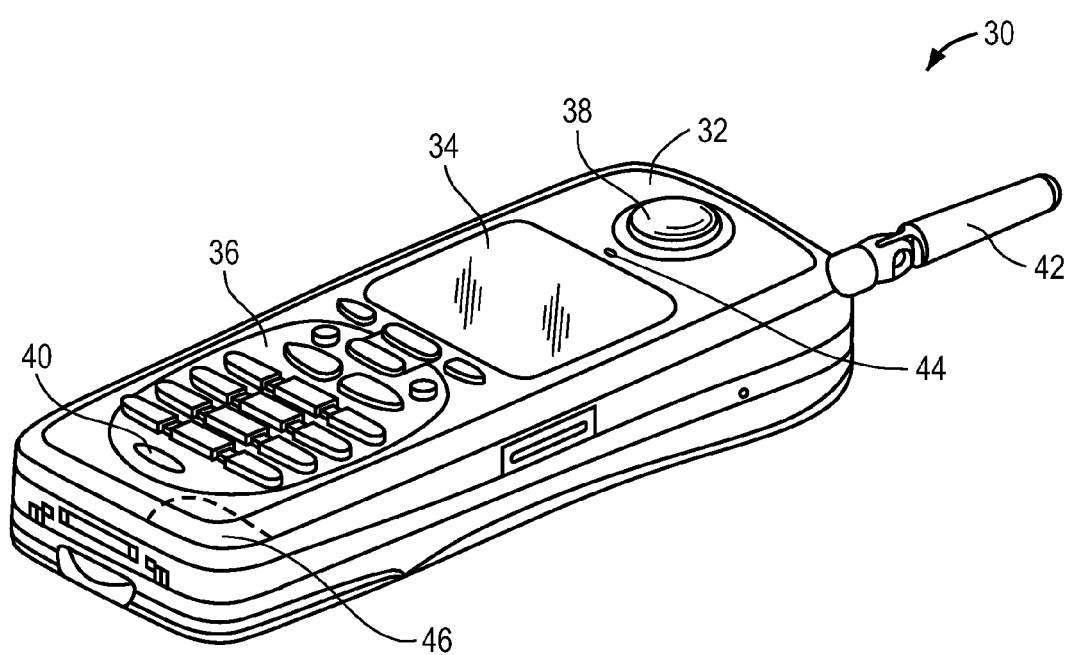
FIG. 2 is a perspective view of a portable device in accordance with one embodiment of the present invention.

FIG. 2 illustrates a portable device 30 according to one embodiment of the invention. FIG. 2 shows a wireless device in a telephone configuration having a "candy-bar" style. In FIG. 2, the wireless device 30 may include various features such as a housing 32, a display device 34, an input device 36 which may be an alphanumeric keypad, a speaker 38, a microphone 40 and an antenna 42. The wireless device 30 also may include an ambient light sensor (ALS) and/or proximity sensor 44 and an accelerometer 46. It will be appreciated that the embodiment of FIG. 2 may use more or fewer sensors and may have a different form factor from the form factor shown in FIG. 2.

The speaker 38 is also shown at an upper portion of the housing 32 above the display device 34. The microphone 40 is shown at a lower portion of the housing 32, below the input device 36. It will be appreciated that the speaker 38 and microphone 40 can be positioned at any location on the housing, but are typically positioned in accordance with a user's ear and mouth, respectively. The proximity sensor 44 is shown at or near the speaker 38 and at least partially within the housing 32. Sensor 44 may be located "adjacent" to speaker 38 (e.g., an earpiece). The term "earpiece" may describe a speaker, an audio transducer, and/or another device for producing sound to be heard by a user's ear. Also, in some embodiments, the term "adjacent" may describe a location of one component on a surface, housing, or portion of a device that is at, on, or within 0.1, 0.25, 0.5, 1, 2, 4, 8, 10 or any combination thereof of inches of another component (e.g., from the closest edges of one component, like a sensor, and another component, like an earpiece). Proximate may also describe one component touching, at, on, proximate to, adjacent to, next to, and/or in the same location as another component. Also, in some embodiments, the term "adjacent" may describe a location that is in a range of between 0.1 millimeters (mm) and 2,000 mm from another location. Moreover, in some embodiments, the term "adjacent" may describe a location that is in a range of between 0.01 mm and 200 mm from another location. Likewise, in some embodiments, the term "adjacent" may describe a location that is in a range of between touching and 30 mm from another location. The accelerometer 46 is shown at a lower portion of the housing 32 and within the housing 32. It will be appreciated that the particular locations of the above-described features may vary in alternative embodiments. It will also be appreciated that the types of sensors, number of sensors, and particular locations of the above-described sensors and features may vary in alternative embodiments.

The display device 34 may be, for example, a liquid crystal display (LCD) (e.g., with a backlight) which does not include the ability to accept inputs or a touch input screen which also includes an LCD. Sensor 44 may be operated as described herein and may detect proximity as described herein. The input device 36 may include, for example, buttons, switches, dials, sliders, keys or keypad, navigation pad, touch pad, touch screen, and the like.

Any well-known speaker, microphone and antenna can be used for speaker 38, microphone 40 and antenna 42, respectively.

Figure 7A:
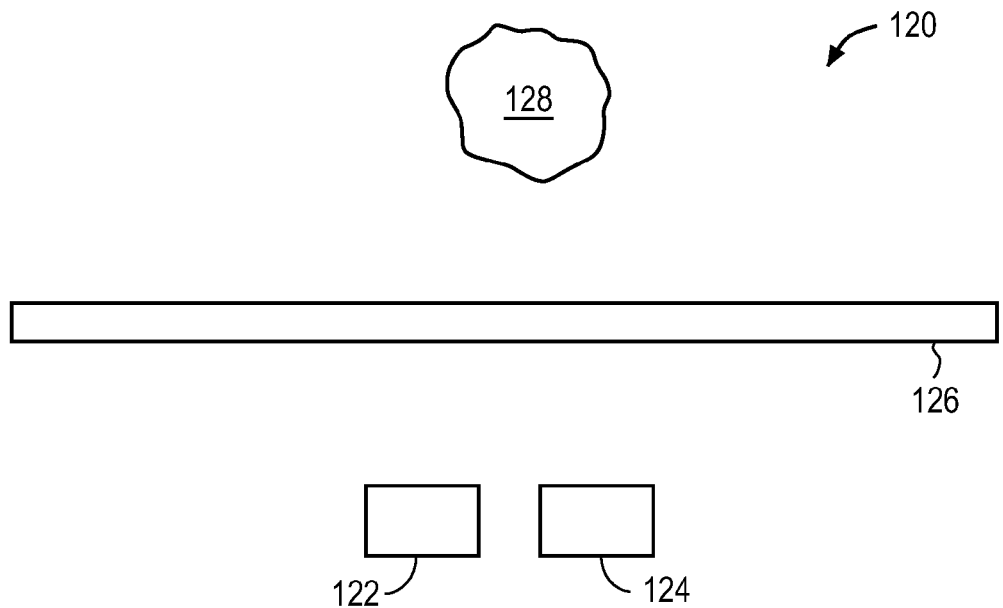
FIG. 7A is a schematic side view of a proximity sensor in accordance with one embodiment of the present invention.

The ALS and/or proximity sensor 44 may describe one or more ALS sensors, proximity sensors, and/or combined proximity and ALS sensors. Sensor 44 may detect location (e.g. at least one of X, Y, Z), direction of motion, speed, etc. of objects relative to the wireless device 30 (e.g., to sensor 44), and/or an ambient light environment at device 30 (e.g., at sensor 44). A location or proximity determination of an object relative to the wireless device can be represented as a distance between the closest point or surface of the object and the proximity sensor of the device, in at least certain embodiments. The proximity sensor may generate location or movement output data or both, which may be used to determine the proximity of objects relative to the portable device 30 and/or relative to proximity sensor 44. An example of a proximity sensor is shown in FIG. 7A.

In addition, a processing device (not shown) is coupled to the proximity sensor(s) 44. The processing device may be used to determine the location of objects and/or an ambient light environment relative to the portable device 30, the ALS and/or or proximity sensor 44 based on the ambient light, location and/or movement data provided by the ALS and/or proximity sensor 44. The ALS and/or proximity sensor may continuously or periodically monitor the ambient light and/or object location. The proximity sensor may also be able to determine the type of object it is detecting. The ALSs described herein may be able to detect in intensity, brightness, amplitude, or level of ambient light and/or ambient visible light, incident upon the ALS and/or proximity sensor.

Additional information about proximity sensors can be found in co-pending U.S. patent application Ser. No. 11/241,839, titled "PROXIMITY DETECTOR IN HANDHELD DEVICE," and U.S. patent application Ser. No. 11/240,788, titled "PROXIMITY DETECTOR IN HANDHELD DEVICE;" U.S. patent application Ser. No. 11/165,958, titled "METHODS AND APPARATUS FOR REMOTELY DETECTING PRESENCE," filed Jun. 23, 2005; and U.S. Pat. No. 6,583,676, titled "PROXIMITY/TOUCH DETECTOR AND CALIBRATION CIRCUIT," issued Jun. 24, 2003, all of which are incorporated herein by reference in their entirety.

According to one embodiment, the accelerometer 46 is able to detect a movement including an acceleration or de-acceleration of the wireless device. The accelerometer 46 may generate movement output data for multiple dimensions, which may be used to determine a direction of movement of the wireless device. For example, the accelerometer 46 may generate X, Y and Z axis acceleration information when the accelerometer 46 detects that the portable device is moved. In one embodiment, the accelerometer 46 may be implemented as described in U.S. Pat. No. 6,520,013, which is incorporated herein by reference in its entirety. Alternatively, the accelerometer 46 may be a KGF01 accelerometer from Kionix or an ADXL311 accelerometer from Analog Devices or other accelerometers which are known in the art.

In addition, a processing device (not shown) is coupled to the accelerometer(s) 46. The processing device may be used to calculate a direction of movement, also referred to as a movement vector of the wireless device 30. The movement vector may be determined according to one or more predetermined formulas based on the movement output data (e.g., movement in X, Y and Z) provided by accelerometer 46. The processing device may be integrated with the accelerometer 46 or integrated with other components, such as, for example, a chipset of a microprocessor, of the portable device.

The accelerometer 46 may continuously or periodically monitor the movement of the portable device. As a result, an orientation of the portable device prior to the movement and after the movement may be determined based on the movement output data provided by the accelerometer attached to the portable device. Additional information about accelerometers can be found in co-pending U.S. patent application Ser.

No. 10/986,730, filed Nov. 12, 2004, which is hereby incorporated herein by reference in its entirety.

The output data acquired from the ALS and/or proximity sensor 44 and the accelerometer 46 can be combined together, or used alone, to gather information about the user's activities. The output data from the ALS and/or proximity sensor 44, the accelerometer 46 or both can be used, for example, to activate/deactivate a display backlight, initiate commands, make selections, control scrolling or other movement in a display, control input device settings, or to make other changes to one or more settings of the device.

Figure 3:
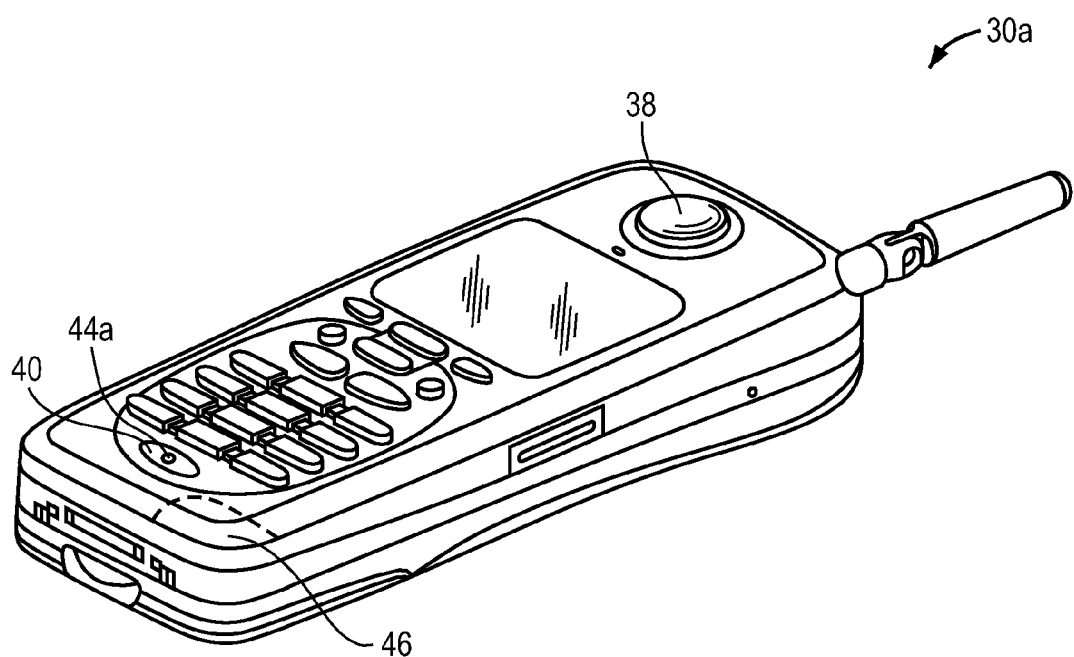
FIG. 3 is a perspective view of a portable device in accordance with one embodiment of the present invention.

FIG. 3 shows an alternative portable device 30a, which is similar to the portable device 30 illustrated in FIG. 2. The portable device 30a shown in FIG. 3 can differ from the portable device 30 shown in FIG. 2 in that the ALS and/or proximity sensor 44a (FIG. 3) is located at or near the microphone 40.

Figure 4:
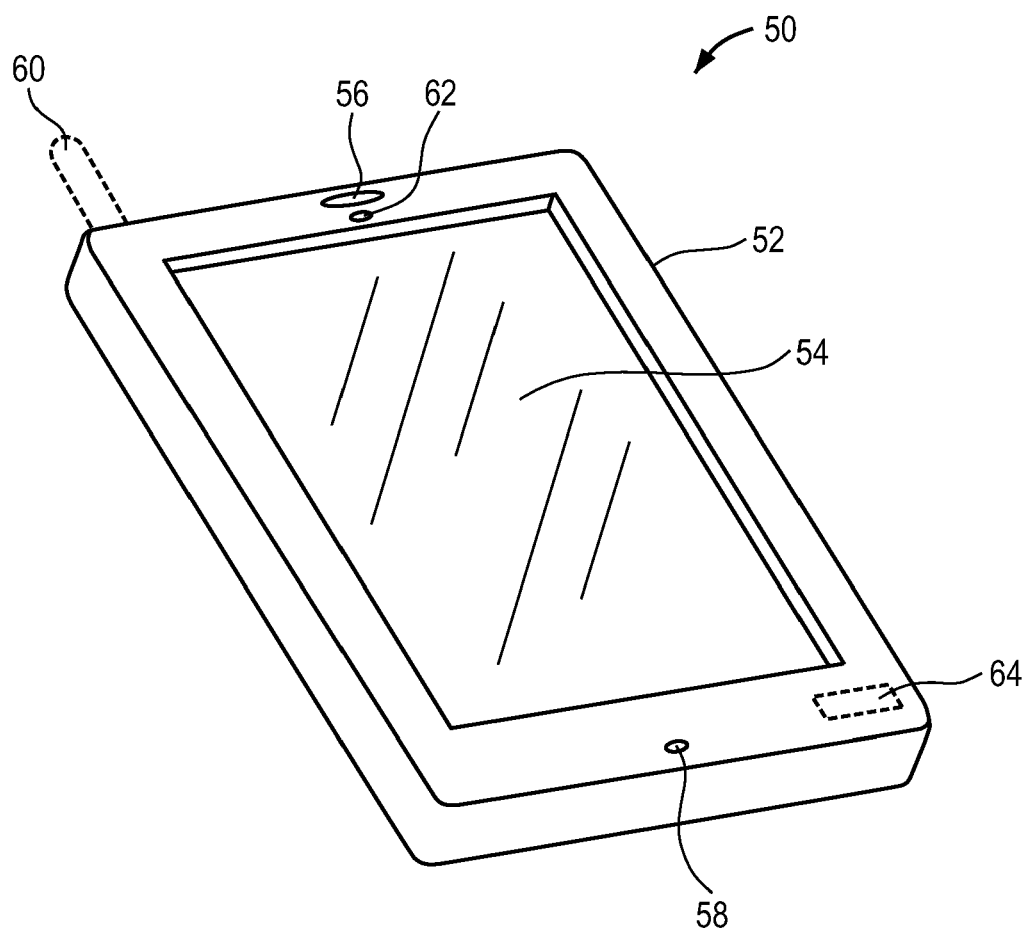
FIG. 4 is a perspective view of a portable device in accordance with one embodiment of the present invention.

FIG. 4 shows a portable device 50 in accordance with one embodiment of the invention. The portable device 50 may include a housing 52, a display/input device 54, a speaker 56, a microphone 58 and an optional antenna 60 (which may be visible on the exterior of the housing or may be concealed within the housing). The portable device 50 also may include an ALS and/or proximity sensor 62, other sensors, and an accelerometer 64. The portable device 50 may be a cellular telephone or a device which is an integrated PDA and a cellular telephone or a device which is an integrated media player and a cellular telephone or a device which is both an entertainment system (e.g. for playing games) and a cellular telephone, or the portable device 50 may be other types of devices described herein. In one particular embodiment, the portable device 50 may include a cellular telephone and a media player and a PDA, all contained within the housing 52. The portable device 50 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 54 may include a multi-point touch input screen (e.g., user input device) in addition to being a display, such as an LCD. For instance, in at least certain embodiments, the device may have at least one input device (e.g. a keypad or keyboard or touch input panel) which is designed to receive intentional user inputs (e.g. which specify a specific user entry) in addition to one or more sensors which are distinct and separate from the at least one input device and which sensors are not designed to receive intentional user inputs. In fact, a user may not even be aware of the presence of the one or more sensors on the device.

In one embodiment, the multi-point touch screen is a capacitive sensing medium configured to detect one or more touches. For instance, the input device may provide a "blob" detection output, a "far-field recognition" output, and/or an "irregular contacts" output in response or based on receiving a number of simultaneous capacitive input detections to a number of input keys or locations of an input device (e.g., such as inputs that form an irregular location pattern or shape). Also, the blob detected may be multiple touches (e.g., blobs on the display from a user's face or multiple fingers concurrently touching or nearly touching the display) or near touches (e.g., blobs on the display) that occur at the same time (e.g., simultaneously) and at distinct locations in the plane of the touch panel and to produce distinct signals representative of the location of the touches on the plane of the touch panel for each of the multiple touches. Additional information about multi-point input touch screens can be found in co-pending U.S. patent application Ser. No. 10/840,862, filed May 6, 2004 (see published U.S. patent application 20060097991), which is incorporated herein by reference in its entirety. A multi-point input touch screen may also be referred to as a multi-touch input panel. Additional information about a "blob" detection output, a "far-field recognition" output, and/or an "irregular contacts" output is provided further below.

A processing device (not shown) may be coupled to the display/input device 54. The processing device may be used to calculate proximity, ALS and/or touches on the touch panel. The display/input device 54 can use the detected touch (e.g., blob or blobs from a user's face) output data to, for example, determine the proximity or location of certain objects and to also identify the type of object touching (or nearly touching) the display/input device 54.

The output data acquired from the ALS and/or proximity sensor 62 and the display/input device 54 can be combined to gather information about the user's activities as described herein. The output data from the ALS and/or proximity sensor 62 and the display/input device 54 can be used to change one or more settings of the portable device 50, such as, for example, change an illumination or backlight setting of the display/input device 54.

In embodiments, the display/input device 54 occupies a large portion, substantially all of, or at least 75% of one surface (e.g. the top surface) of the housing 52 of the portable device 50. In an alternate embodiment the display/input device can occupies less than 75% of one surface (e.g. the top surface) of the housing 52 of the portable device 50. Also, in alternative embodiments, the portable device 50 may include a display which does not have input capabilities, but the display still occupies a large portion of one surface of the portable device 50. In this case, the portable device 50 may include other types of input devices such as a QWERTY keyboard or other types of keyboard which slide out or swing out from a portion of the portable device 50.

Figure 5A:
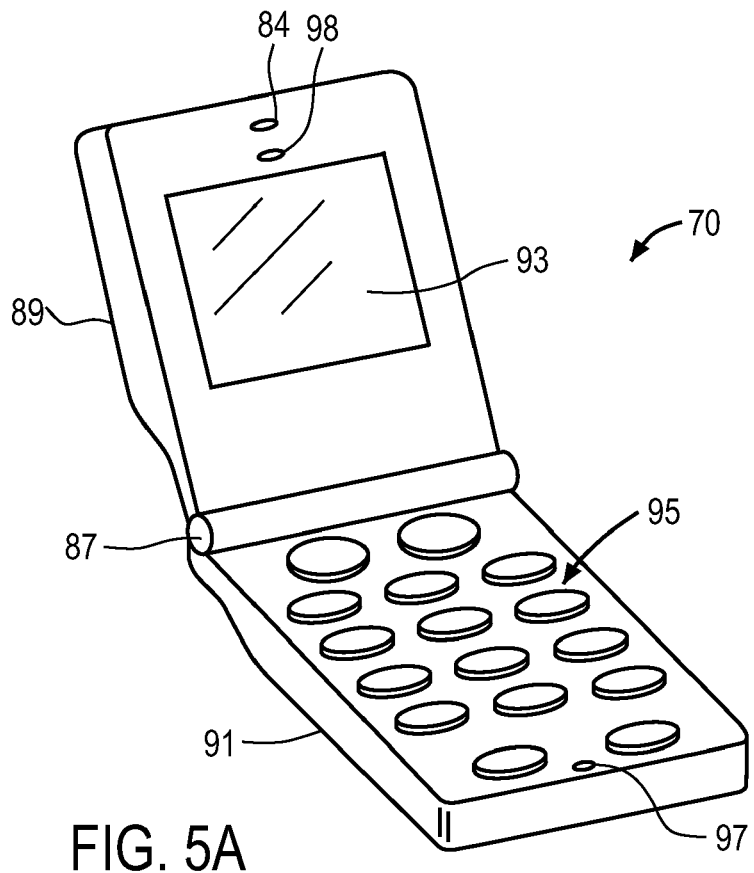
FIG. 5A is a perspective view of a portable device in a first configuration (e.g. in an open configuration) in accordance with one embodiment of the present invention.
Figure 5B:
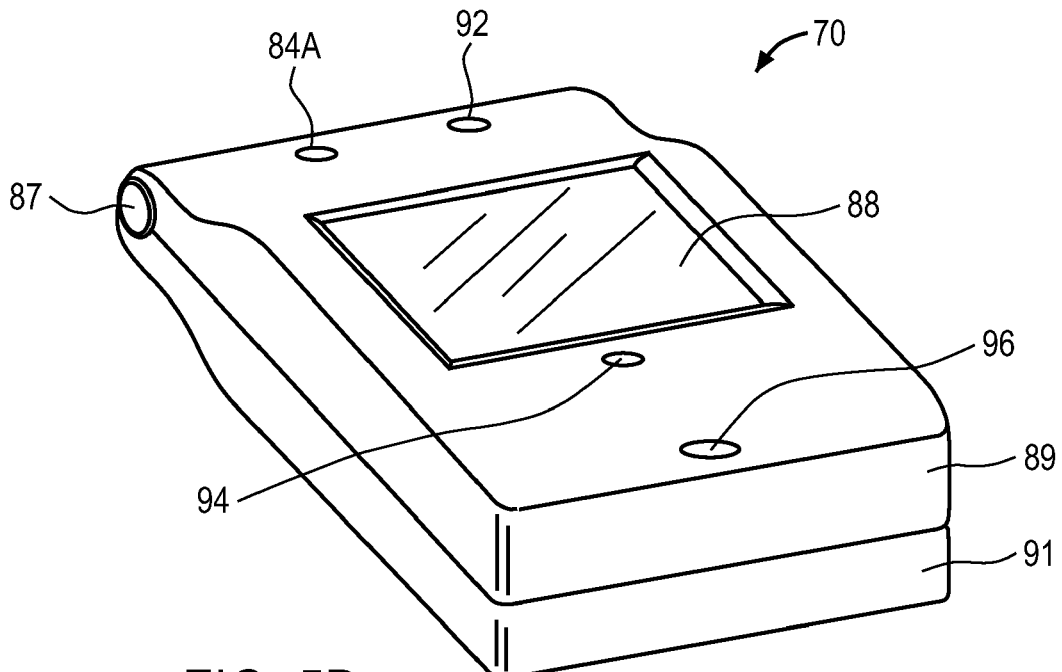
FIG. 5B is a perspective view of the portable device of FIG. 5A in a second configuration (e.g. a closed configuration) in accordance with one embodiment of the present invention.

FIGS. 5A and 5B illustrate a portable device 70 according to one embodiment of the invention. The portable device 70 may be a cellular telephone which includes a hinge 87 that couples a display housing 89 to a keypad housing 91. The hinge 87 allows a user to open and close the cellular telephone so that it can be placed in at least one of two different configurations shown in FIGS. 5A and 5B. In one particular embodiment, the hinge 87 may rotatably couple the display housing to the keypad housing. In particular, a user can open the cellular telephone to place it in the open configuration shown in FIG. 5A and can close the cellular telephone to place it in the closed configuration shown in FIG. 5B. The keypad housing 91 may include a keypad 95 which receives inputs (e.g. telephone number inputs or other alphanumeric inputs) from a user and a microphone 97 which receives voice input from the user. The display housing 89 may include, on its interior surface, a display 93 (e.g. an LCD) and a speaker 98 and an ALS and/or proximity sensor 84 adjacent to speaker 98; on its exterior surface, the display housing 89 may include a speaker 96, a temperature sensor 94, a display 88 (e.g. another LCD), an ambient light sensor 92, and an ALS and/or proximity sensor 84A adjacent to speaker 96. Hence, in this embodiment, the display housing 89 may include a first ALS and/or proximity sensor on its interior surface and a second ALS and/or proximity sensor on its exterior surface. The first ALS and/or proximity sensor may be used to detect an ambient light environment and/or a user's head or ear being within a certain distance of the first ALS and/or proximity sensor and to cause an illumination setting of displays 93 and 88 to be changed (automatically or not) in response to this detecting.

In at least certain embodiments, the portable device 70 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

It is also considered that and electronic device or portable device described herein, such as the devices shown in FIGS. 2, 3, 4, 5A and 5B, may have a form factor or configuration having a "candy-bar" style, a "flip-phone" style, a "sliding" form, and or a "swinging" form. For example, a "candy-bar" style may be described above in FIG. 2 for wireless device 30. Also, a "flip-phone" style may be described above in FIG. 5A and 5B for device 70. A "sliding" form may describe where a keypad portion of a device slides away from another portion (e.g., the other portion including a display) of the device, such as by sliding along guides or rails on one of the portions. A "swinging" form may describe where a keypad portion of a device swings sideways away (as opposed to the "flip-phone" style swinging up and down) from another portion (e.g., the other portion including a display) of the device, such as by swinging on a hinge attaching the portions.

Figure 6:
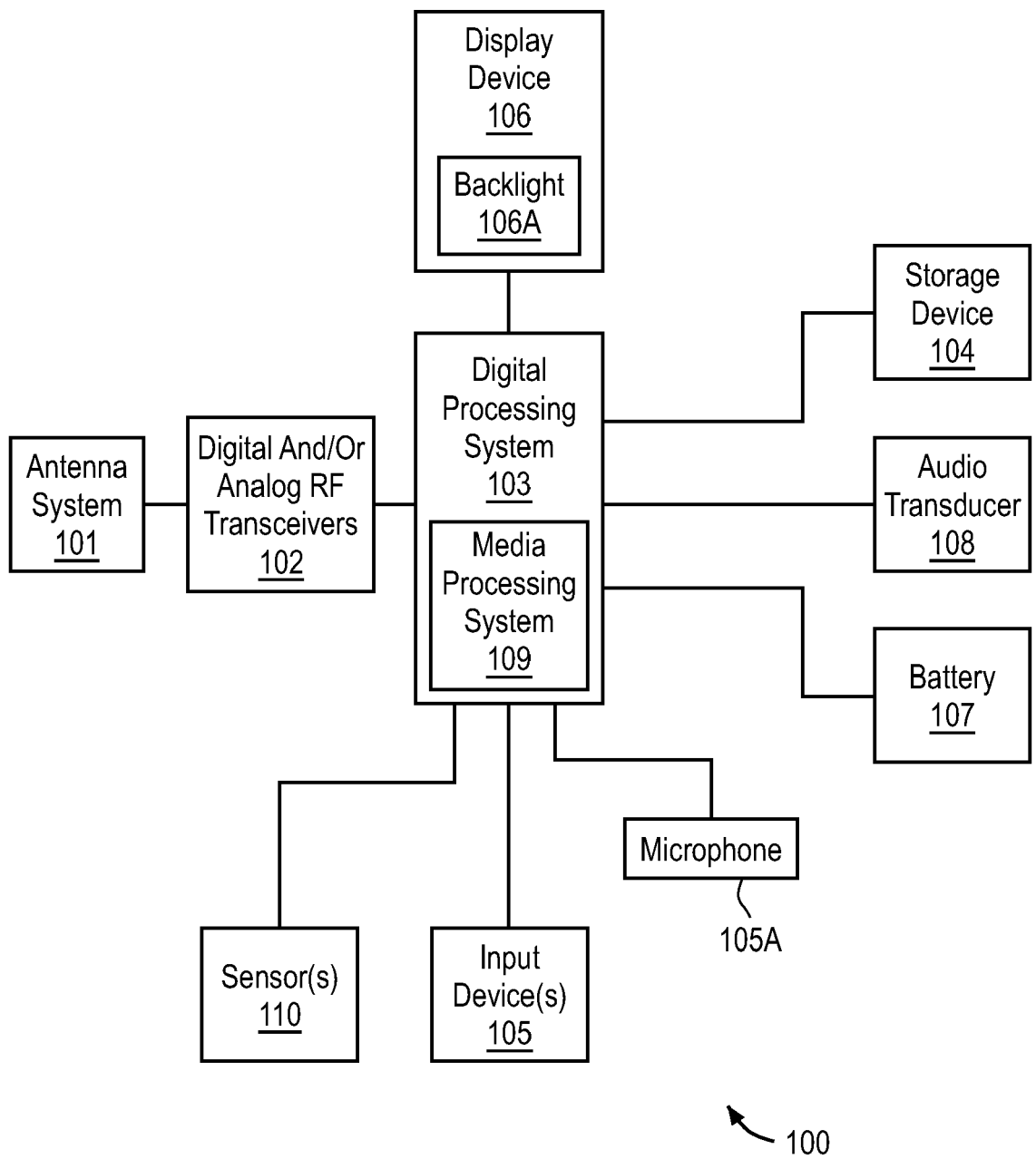
FIG. 6 is a block diagram of a system in which embodiments of the present invention can be implemented.

Each of the devices shown in FIGS. 2, 3, 4, 5A and 5B may be a wireless communication device, such as a cellular telephone, and may include a plurality of components which provide a capability for wireless communication. FIG. 6 shows an embodiment of a wireless device 100 which includes the capability for wireless communication. The wireless device 100 may be included in any one of the devices shown in FIGS. 2, 3, 4, 5A and 5B, although alternative embodiments of those devices of FIGS. 2-5B may include more or fewer components than the wireless device 100.

Wireless device 100 may include an antenna system 101. Wireless device 100 may also include one or more digital and/or analog radio frequency (RF) transceivers 102, coupled to the antenna system 101, to transmit and/or receive voice, digital data and/or media signals through antenna system 101. Transceivers 102, may include on or more infrared (IR) transceivers, WiFi transceivers, Blue Tooth™ transceivers, and/or wireless cellular transceivers.

Wireless device 100 may also include a digital processing device or system 103 to control the digital RF transceivers and to manage the voice, digital data and/or media signals. Digital processing system 103 may be a general purpose processing device, such as a microprocessor or controller for example. Digital processing system 103 may also be a special purpose processing device, such as an ASIC (application specific integrated circuit), FPGA (field-programmable gate array) or DSP (digital signal processor). Digital processing system 103 may also include other devices, as are known in the art, to interface with other components of wireless device 100. For example, digital processing system 103 may include analog-to-digital and digital-to-analog converters to interface with other components of wireless device 100. Digital processing system 103 may include a media processing system 109, which may also include a general purpose or special purpose processing device to manage media, such as files of audio data.

Wireless device 100 may also include a storage device 104 (e.g., memory), coupled to the digital processing system, to store data and/or operating programs for the wireless device 100. Storage device 104 may be, for example, any type of solid-state or magnetic memory device.

Wireless device 100 may also include one or more input devices 105 (e.g., user interface controls, or I/O devices), coupled to the digital processing system 103, to accept user inputs (e.g., telephone numbers, names, addresses, media selections, user settings, etc.) Input device 105 may be, for example, one or more of a keypad, a touchpad, a touch screen, a pointing device in combination with a display device or similar input device.

Wireless device 100 may also include at least one display device 106, coupled to the digital processing system 103, to display text, images, and/or video. Device 106 may display information such as messages, telephone call information, user settings, user selected brightness levels, contact information, pictures, movies and/or titles or other indicators of media being selected via the input device 105. Display device 106 may be, for example, an LCD display device. In one embodiment, display device 106 and input device 105 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 106 may include a backlight 106a to illuminate the display device 106 under certain circumstances. It will be appreciated that the wireless device 100 may include multiple displays.

Wireless device 100 may also include a battery 107 to supply operating power to components of the system including digital RF transceivers 102, digital processing system 103, storage device 104, input device 105, microphone 105A, audio transducer 108 (e.g., a speaker or earpiece), media processing system 109, sensor(s) 110, and display device 106. Battery 107 may be, for example, a rechargeable or non-rechargeable lithium or nickel metal hydride battery.

Wireless device 100 may also include one or more sensors 110 coupled to the digital processing system 103. The sensor(s) 110 may include, for example, one or more of a proximity sensor, accelerometer, touch input panel, ambient light sensor, ambient noise sensor, temperature sensor, gyroscope, a blob sensor, an irregular contacts sensor, a capacitive sensor, a far-field recognition sensor, a hinge detector, a position determination device, an orientation determination device, a motion sensor, a sound sensor, a radio frequency electromagnetic wave sensor, and other types of sensors and combinations thereof.

Also, in some embodiments, sensors, displays, transceivers, digital processing systems, processor, processing logic, memories and/or storage device may include one or more integrated circuits disposed on one or more printed circuit boards (PCB).

Figure 7B:
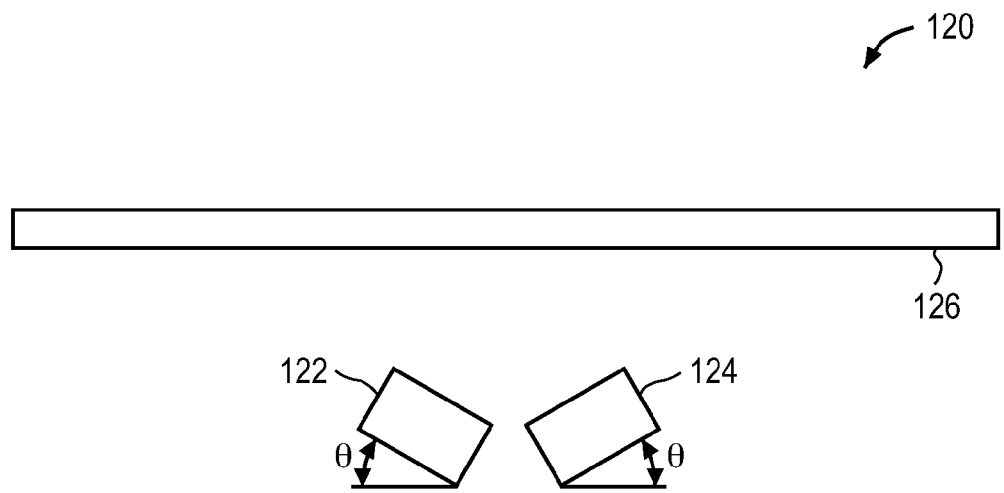
FIG. 7B is a schematic side view of an alternative proximity sensor in accordance with one embodiment of the present invention.

FIGS. 7A and 7B illustrate exemplary proximity sensors in accordance with embodiments of the invention. It will be appreciated that, in alternative embodiments, other types of proximity sensors, such as capacitive sensors or sonar-like sensors, may be used rather than the proximity sensors shown in FIGS. 7A and 7B. In FIG. 7A, the proximity sensor 120 includes an emitter 122, a detector 124, and a window 126. The emitter 122 generates light in the infrared (IR) bands, and may be, for example, a Light Emitting Diode (LED). The detector 124 is configured to detect changes in light intensity and may be, for example, a phototransistor. The window 126 may be formed from translucent or semi-translucent material. In one embodiment, the window 126 is an acoustic mesh, such as, for example, a mesh typically found with a microphone or speaker of the portable device. In other embodiments, the window 126 may be MicroPerf, IR transparent strands wound in a mesh, or a cold mirror.

During operation, the light from the emitter 122 hits an object 128 and scatters (e.g., is reflected by the object) when the object is present above the window 126. The light from the emitter may be emitted in square wave pulses which have a known frequency, thereby allowing the detector 124 to distinguish between ambient light and light from emitter 122 which is reflected by an object (e.g., a shape and/or material of the object), such as the user's head, hair, or ear or a material thereof, back to the detector 124. At least a portion of the scattered light is reflected towards the detector 124. The reflected light power (e.g., intensity) and/or increase in power is detected by the detector 124, and output as an output signal to a device (e.g., a processor, processing system, or software). This output signal is interpreted by the device (not shown in FIG. 7A) to make a proximity determination that an object is present within a short distance of the detector 124. If no object is present or the object is beyond a certain distance from the detector 124, an insufficient or smaller amount of the emitted light is reflected back towards the detector 124, and the output signal is interpreted by the device to mean that an object is not present or is at a relatively large distance. In each case, the proximity sensor is measuring (e.g., outputting) the intensity of reflected light which is related to the distance between the object which reflects the light and detector 124.

In FIG. 7B, the emitter 122 and detector 124 of the proximity sensor are angled inward towards one another to improve detection of the reflected light, but the proximity sensor of FIG. 7B otherwise operates in a manner similar to the proximity sensor of FIG. 7A.

A proximity sensor in one embodiment of the inventions includes the ability to both sense proximity and detect electromagnetic radiation, such as ambient light, from a source other than the emitter of the proximity sensor. The use of IR light for both the emitter and the detector of the proximity sensor may be advantageous because IR light is substantially present in most sources of ambient light (such as sunshine, incandescent lamps, LED light sources, candles, and to some extent, even fluorescent lamps). Thus, the detector can detect ambient IR light, which will generally represent, in most environments, ambient light levels at wavelengths other than IR, and use the ambient IR light level to effectively and reasonably accurately represent ambient light levels at wavelengths other than IR.

Figure 7C:
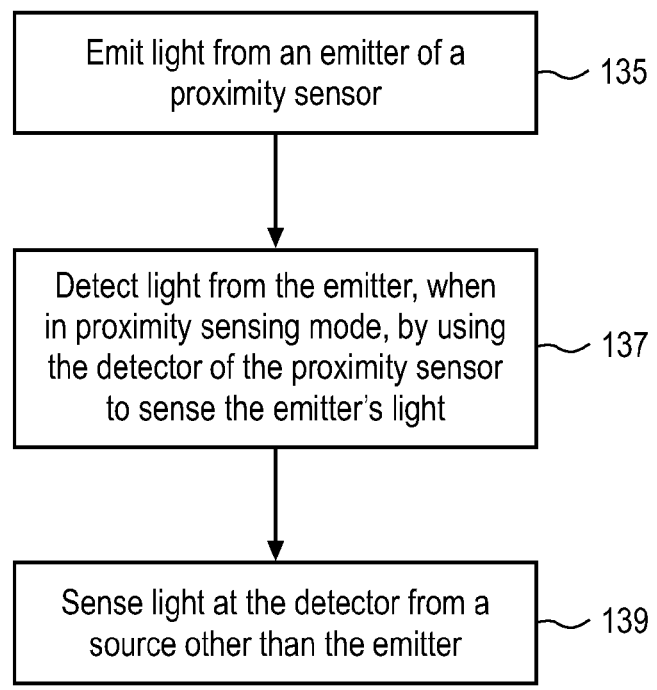
FIG. 7C is a flow chart which shows a method of operating a proximity sensor which is capable of detecting light from a source other than the emitter of the proximity sensor.
Figure 7D:
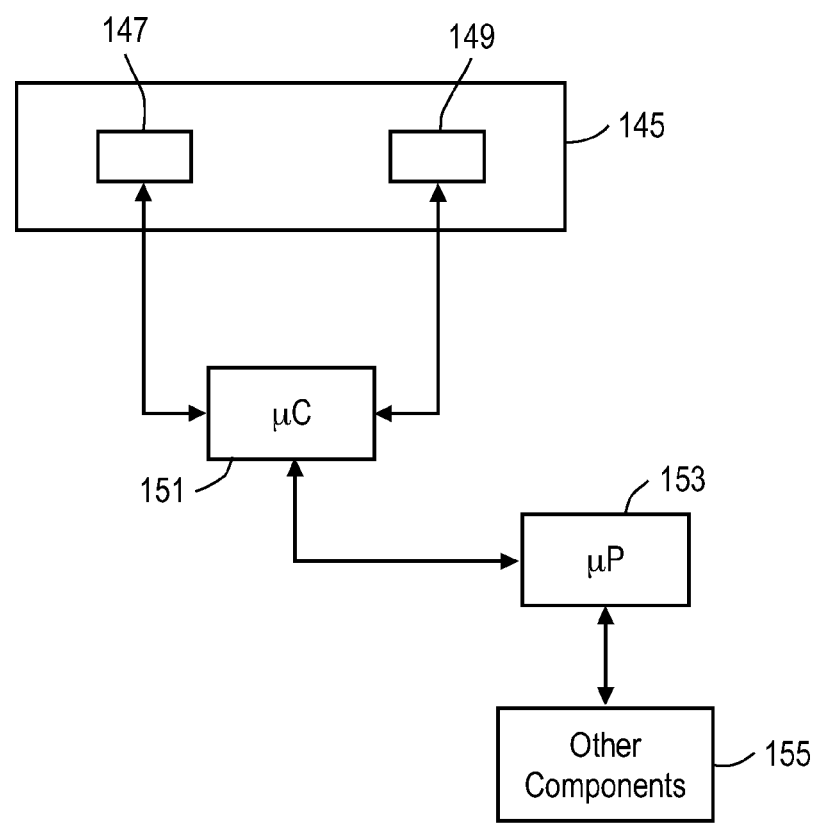
FIG. 7D shows an example of a proximity sensor with associated logic.

A method of operating a proximity sensor which includes the ability to both sense proximity and detect light is shown in FIG. 7C and an example, in block diagram form, of such a proximity sensor is shown in FIG. 7D. The method of FIG. 7C may use the proximity sensor shown in FIG. 7D or other proximity sensors. The method includes operation 135 in which electromagnetic radiation (e.g. IR light) is emitted from the emitter of the proximity sensor. The emitter may emit the radiation in a known, predetermined pattern (e.g. a train of square wave pulses of known, predetermined pulse width and frequency) which allows a detector to distinguish between ambient radiation and radiation from the emitter. In operation 137, the detector of the proximity sensor detects and measures light from the emitter when the detector is operating in proximity sensing mode. A processor coupled to the detector may process the output signal from the detector to identify the known predetermined pattern of radiation from the emitter and to measure the amount of radiation from the emitter. In operation 139, the detector is used in a mode to sense radiation (e.g. ambient IR light) from a source other than the emitter; this operation may be implemented in a variety of ways. For example, the emitted light from the emitter may be disabled by a shutter (either a mechanical or electrical shutter) placed over the emitter or the emitter's power source may be turned off (thereby stopping the emission of radiation from the emitter). Alternatively, known signal processing techniques may be used to remove the effect of the emitter's emitted light which is received at the detector in order to extract out the light from sources other than the emitter. It will be appreciated that operations 135, 137 and 139 may be performed in a sequence which is different than the sequence shown in FIG. 7C.

FIG. 7D shows an embodiment of a range sensing IR proximity sensor 145 which includes the ability to sense and detect proximity and to detect and measure ambient light levels (e.g., sent as proximity sensor and/or ALS outputs). The proximity sensor 145 includes an IR emitter 147 (e.g. an IR LED) and an IR detector 149. An optional shutter (e.g. an LCD electronic shutter) may be disposed over the emitter 147. The IR emitter 147 and the IR detector 149 may be coupled to a microcontroller 151 which may control switching between proximity sensing mode and ambient light sensing mode by either closing and opening an optional shutter or by turning on and off the power to the IR emitter 147. The output from the IR detector 149 may be provided from the microcontroller 151 to the microprocessor 153 which determines, from output data from the proximity sensor 145, at least one proximity output value and determines at least one ambient light level output value. In an alternative embodiment, the microprocessor may be coupled to the IR emitter 147 and to the IR detector 149 without an intervening microcontroller, and the microprocessor may perform the functions of the microcontroller (e.g. the microprocessor may control switching between proximity sensing mode and ambient light sensing mode). The microprocessor 153 may be coupled to other components 155, such as input (e.g. keypad) or output (e.g. display) devices or memory devices or other sensors or a wireless transceiver system, etc., such as to alter settings of the device. For example, the microprocessor 153 may be the main processor of the wireless device 100 shown in FIG. 6. In those embodiments in which a shutter over the IR emitter is not used and IR emissions from the IR emitter 147 are received at the IR detector 149 while the IR detector 149 is measuring ambient light levels, the microprocessor 153 (or the microcontroller 151) may filter out the known predetermined pattern of IR light from the IR emitter 147 in order to extract a signal from the IR detector 149 representing the IR light level from sources other than the IR emitter 147. Additional information about such sensors can be found in co-pending U.S. patent application Ser. No. 11/600,344, filed Nov. 15, 2006 titled "INTEGRATED PROXIMITY SENSOR AND LIGHT SENSOR" which is incorporated herein by reference in its entirety.

Figure 8:
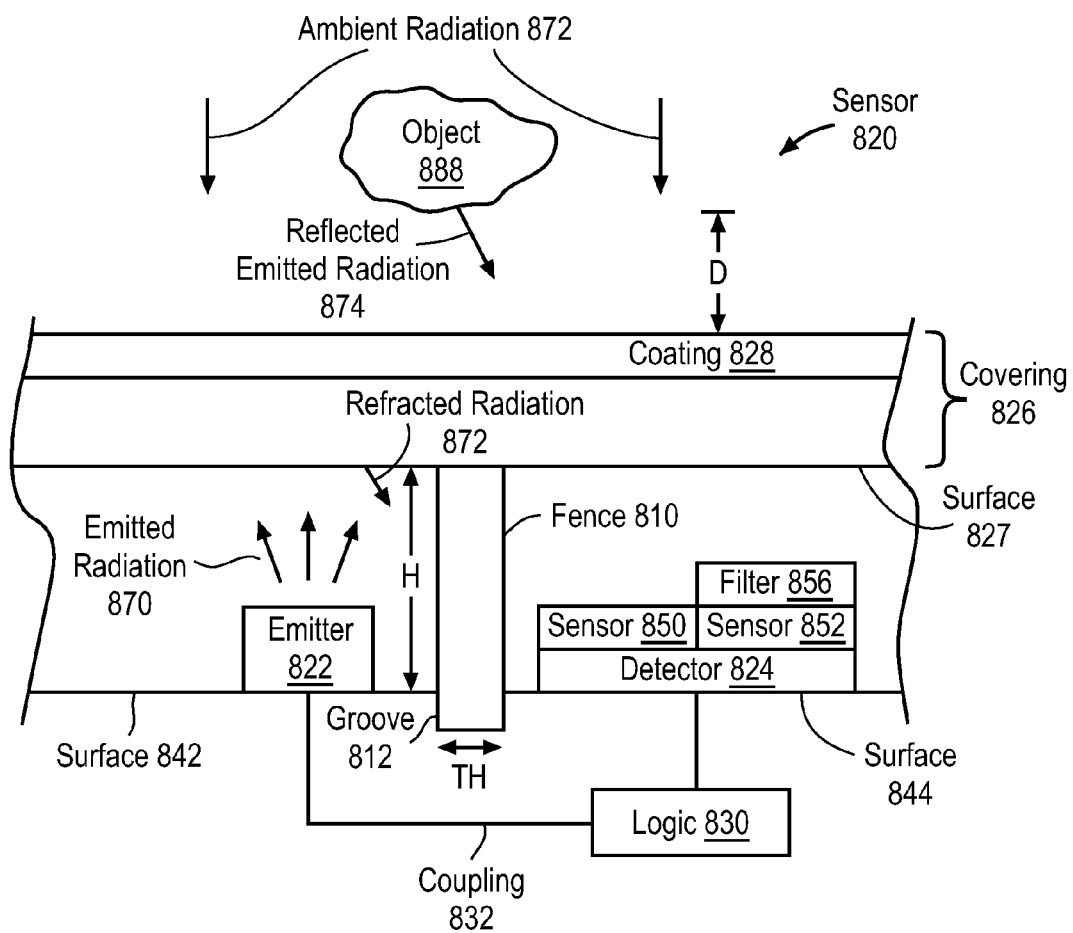
FIG. 8 is a schematic side view of a combined proximity sensor and ambient light sensor in accordance with one embodiment of the invention.

FIG. 8 is a schematic side view of a combined proximity sensor and ambient light sensor in accordance with one embodiment of the invention. FIG. 8 shows combined sensor 820 including emitter 822, detector 824 and covering 826, such as to detect the proximity of an object to the sensor and an ambient light level or intensity at the sensor. FIG. 8 also shows logic 830, such as a processor and/or processing logic for controlling, receiving, scaling, subtracting, and/or determining outputs of components of sensor 820 (e.g., emitter 822, detector 824, logic 830 and components thereof) to determine proximity and/or ambient light. FIG. 8 also shows fence 810, such as a fence that is antireflective or non-transmissive for radiation of emitter 822. Fence 810 may be a fence, a wall or a barrier disposed between the emitter and the detector, extending all the way up to covering 826. Fence 810 is optional. Covering 826 may or may not be a covering similar to covering 126, emitter 822 may or may not be an emitter similar to emitter 122 as described above for FIGS. 7A through 7D.

Emitter 822 is shown emitting emitted radiation 870 which may be refracted as refracted radiation 872 by covering 826. Emitter 822 may be an infrared (IR) light emitter or transmitter, and may emit IR light modulated at a modulation frequency (e.g., as predetermined pattern or pulses as described for FIGS. 7C and 7D). Also, radiation 870 may be reflected by object 888 as shown by reflected emitter radiation 874, which may be received by detector 824. Object 888 may be an object having proximity D and an IR light reflective surface or material, and may be an object like object 128.

FIG. 8 shows detector 824 including sensor 850, sensor 852, and filter 856. Sensor 850 may be described as a sensor configured to detect electromagnetic radiation from emitter 822, and ambient radiation 872. Sensor 852 may be a sensor as described above for sensor 850, except that sensor 852 is covered with or has filter 856 disposed between sensor 852 and radiation 870, 874, and 872. Filter 856 may be described as a passband filter for IR light, but not passing visible light, such as to pass IR light from incandescent bulbs and fluorescent bulb, as well as radiation 870 and 874, but not to pass visible light from incandescent bulbs and fluorescent bulb. Thus, sensor 852 may detect electromagnetic radiation from radiation 870, radiation 874, and/or ambient IR radiation from radiation 872, but may not receive or sense visible light from radiation 872.

Logic 830 may modulate the emitter IR light and/or to turn the emitter on and off. The IR light from radiation 872 may be filtered out or distinguished from the output of sensor 852 by logic 830. Distinguishing the emitted IR from ambient IR by detecting for emitted IR during one time period and for ambient IR during another (e.g., as predetermined pattern or pulses as described for FIGS. 7C and 7D) may be described as TDM, timeslicing and multiplexing, and/or using a waveform filter. Detector 824 and/or logic 830 may be used to sense proximity (e.g., sent as proximity sensor and/or ALS outputs) of the object to combined sensor 820, and may determine a visible light intensity of ambient radiation 872. Additional information about such combined or integrated sensors can be found in U.S. patent application Ser. No. 11/650,117, filed Jan. 5, 2007 by ANTHONY M. FADELL AND ACHIM PANTFOERDER, titled "INTEGRATED PROXIMITY SENSOR AND LIGHT SENSOR" which is incorporated herein by reference in its entirety.

The term "substantially" may refer to the specific value noted herein, or, in some cases, a range within 1, 2 or 5 percent of that value. The terms "processing logic" as described herein may describe a device, a processor, circuitry, software, a memory, and/or a combination of any or all of the above. Similarly, the term "sensor" may include the above descriptions for processing logic. Also, use of the term "detect" and derivations therefrom may be similar to that described herein for use of the term "sense" and derivations thereof, and vice versa.

It will be appreciated that at least some of the sensors which are used with embodiments of the inventions may determine or provide output data which represents an analog value. In other words, the data represents a value which can be any one of a set of possible values which can vary continuously or substantially continuously, rather than being discrete values which have quantum, discrete jumps from one value to the next value. Further, the value represented by the data may not be predetermined. For example, in the case of a distance measured by a proximity sensor, the distance is not predetermined, unlike values of keys on a keypad which represent a predetermined value. For example, a proximity sensor may determine or provide output data (e.g., via an output a signal) that represents a distance which can vary continuously or nearly continuously in an analog fashion. In the case of such a proximity sensor, the output may be based on or proportional to the intensity of reflected light which originated from the emitter of the proximity sensor. A temperature sensor may determine or provide output data that represents a temperature, which is an analog value. A light sensor, such as an ambient light sensor, may determine or provide output data that represents a light intensity which is an analog value. A motion sensor, such as an accelerometer, may determine or provide output data which represents a measurement of motion (e.g. velocity or acceleration or both). A gyroscope may determine or provide output data which represents a measurement of orientation (e.g. amount of pitch or yaw or roll). A sound sensor may determine or provide output data which represents a measurement of sound intensity. For other types of sensors, the output data determined or provided by the sensor may represent an analog value.

Any or all of the sensors mentioned herein may send output data or signals which when received (e.g., by a digital processing system, a data processing device, an electronic device or "device", a processor or an executing software application) are included in or are a basis for sensing proximity, operating a proximity sensor and/or operating a portable device as described herein, such as to (automatically in some cases) set or alter a proximity determination. The proximity determinations may provide evidenced of, determine, or identify user activities. In some cases, a proximity "determination" describes a location, distance, direction or proximity of an object to the device, earpiece, and/or proximity sensor. For instance, the output of sensors (e.g., an accelerometer output greater than a threshold) and a proximity determination (e.g., of an object, such as a large object, in very close proximity) may be used to determine that the device is held at or adjacent to the user's head or ear, which causes the device to turn off a display or backlight to save energy. The determination may consider or be based on output, such as a power level (e.g., value) or rate of change of power level of an output signal of a proximity sensor and an ALS. The output signal may be described as a signal power level, intensity, amplitude, reading, or value output by a sensor based on, proportional to, or otherwise derived from a power or intensity of light received, detected or sensed by the sensor. For a proximity sensor the light received may be received IR light emitted by the sensor and reflected by an object (e.g., a reflection of an emitted IR signal, incident upon the proximity sensor). For an ALS, the light received may be ambient light incident upon the sensor.

Moreover, based on the proximity determination various device settings or actions may be altered, made or performed (e.g., automatically or not by a digital processing system, device, processor or executing software application) such as, for example, activating, deactivating, changing, controlling, and/or altering a setting and/or parameter of a backlight (e.g., backlight 106a). Other responses that may be performed include changing a setting of, or disabling processing of inputs received at an input device (e.g., input device 105). Also, the descriptions for sensors 110, 120, 145, 820, and the like apply to other sensor described herein, including those referred to for FIGS. 1-11.

Figure 9A:
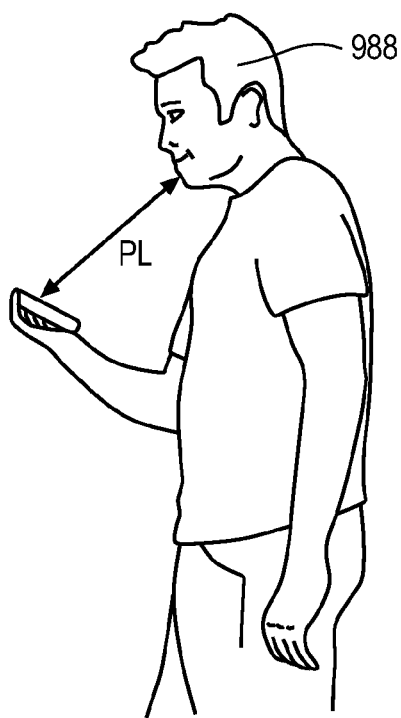
FIGS. 9A-C are views of user activities in accordance with embodiments of the present invention.
Figure 9B:
Figure 9C:
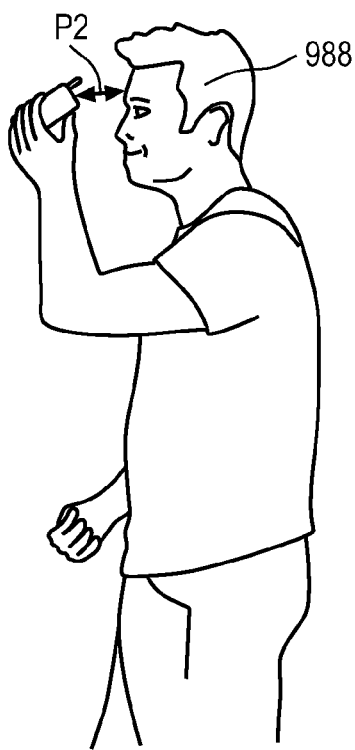

FIGS. 9A-C illustrate exemplary user activities that can be determined based on output signals or data received from one or more sensors of the portable device. Exemplary user activities include, but are not limited to, the user looking directly at the portable device (FIG. 9A), such as where the device has a proximity, location, or proximity determination between the device (e.g., an earpiece or sensor of the device) and the user's head 988 (e.g., an object which may describe or be described by object 128 or 888) of long distance proximity PL. Other examples of proximity PL may include when the device is set down or placed on a surface (not shown). Also, in some embodiments, a long distance proximity PL may describe a location that is in a range of between 0.1 millimeters (mm) and 20,000 mm from another location. Other distances are also considered for proximity PL, such as greater than 6, 12, or 18 inches between two locations.

Other user activities include the user holding the portable device at or near their ear (FIG. 9B), such as where the device has a proximity, location, or proximity determination of very close distance or touching proximity P1. Other examples of proximity P1 may include the device being in a user's pocket or a case (not shown). Moreover, in some embodiments, a very close distance or touching proximity P1 may describe a location that is in a range of between touching and 200 mm from another location. Other distances are also considered for proximity P1, such as less than 0.01, 0.1, 1, 2, or 3 inches between two locations.

More user activities include the user holding the device at, or moving the portable device between a long and a very close distance proximity (FIG. 9C), such as where the device has a proximity, location, or proximity determination of a middle distance proximity P2. Also, in some embodiments, a middle distance proximity P2 may describe a location that is in a range of between 0.01 mm and 2,000 mm from another location. Other distances are also considered for proximity P2, such as ranges of between 0.01 and 0.1 inches, 0.1 and 1 inch, 0.1 and 6 inches, 1 and 2 inches, 1 and 6 inches, or 2 and 20 inches between two locations.

Additional information about user activities and/or gestures that can be monitored in accordance with embodiments of the present invention are disclosed in U.S. patent application Ser. No. 10/903,964, titled "GESTURES FOR TOUCH SENSITIVE INPUT DEVICES," filed Jul. 30, 2004, U.S. patent application Ser. No. 11/038,590, titled "MODE-BASED GRAPHICAL USER INTERFACES FOR TOUCH SENSITIVE INPUT DEVICES," filed Jan. 18, 2005, all of which are incorporated herein by reference in their entirety.

However as noted, depending on the types, colors, surface shapes, and surface textures of materials of the object, the amount of emitted light reflected (e.g., "IR light reflectiveness") can vary widely causing large differences in proximity determinations for objects at the same distance from the proximity sensor. For example, material types such as glass, plastic, metal, and skin are more IR light reflective as compared to cloth, and hair (e.g., which are more IR light absorptive). Also, material colors such as white, silver, and gold are more IR light reflective as compared to black, green, and grey. Next, material surface shapes such as surfaces having most or a portion of the surface perpendicular to the IR emitter or sensor of a proximity sensor are more IR light reflective as compared to shapes having most or all of their surfaces at angles (e.g., at 45 degree, or 90 degree angles) with respect to the emitter or sensor. Finally, material surface textures such as large smooth, curved or flat surfaces are more IR light reflective as compared to bubbled, porous, angled, tall or small feature textured surfaces. More particularly, dark or grey hair is less IR light reflective than skin or a balder head. Thus, a user holding the portable device at or near their ear (FIG. 9B) may result in a middle distance proximity P2 output signal received from proximity sensor adjacent to the earpiece (e.g., a signal higher than normal or higher than long distance proximity PL), when the actual proximity determination should be for a very close distance or touching proximity P1 (e.g., a strikingly high sensor output received for a balder head, shinier object, or more highly IR light reflective object).

Also, as noted above, the display (e.g., a liquid crystal display (LCD)) and/or backlight of the display device may represent one of the largest battery draws or drains of a portable device. In these cases, the longer duration or more time the backlight is on, the more battery energy is consumed by the backlight. Thus, in some embodiments, it may be beneficial to turn off, power down, and/or reduce the amount of time the backlight is on to reduce the effect or amount of battery draw or drain that the backlight of the display device has on the battery.

According to some embodiments, to more accurately determine "actual proximity", an ALS output power level or change in power level received from one or more sensors may be used, consulted, or a basis to operate a proximity sensor of a portable device by (automatically in some cases) setting, altering or changing a proximity determination. A proximity determination may identify or determine a distance, location or "actual proximity" between an object's surface (e.g., reflecting IR light emitted by an emitter) and a sensor, earpiece or device. The proximity detected may be different than a proximity according to a sensor output signal. In other words, the sensor output signal may or may not identify or determine the "actual proximity" or distance between the surface of the object and the sensor, such as depending on the types, colors, surface shapes, and/or surface textures of materials of the object (e.g., with respect to IR light reflectiveness). Thus, the proximity determination may be altered based on the output signal of an ALS to more accurately tell if the user is looking directly at the portable device (FIG. 9A proximity PL), holding the portable device at or near their ear (FIG. 9B proximity P1), or moving the portable device between a long and a very close distance proximity (FIG. 9C proximity P2).

The more accurate proximity and/or user action may be used turn on, turn off, set, change, or alter device settings. Such device settings include, turning on/off a display or a processor processing inputs of an input device. The setting or changing may be to power up, turn on, power down, or turn off, a setting device or parameter of the device such according to an output level or change in level of an ALS output and a proximity sensor output. In some cases, when a change to a light sensor output (e.g., a change in ambient light level) goes below or is less than a threshold limit and a proximity sensor output goes above or is greater than a threshold limit, then a setting of the device powers down, or turns off. This situation may describe where the device is held at a very close distance or touching proximity P1 range to a lower IR reflective object (e.g., user's dark or grey color hair). Thus, although the proximity determination according to the proximity sensor output is for a middle distance proximity P2 range, the decrease in the power level of the ALS output from blocking of the ALS sensor by the object may be used to (automatically in some cases) alter the control of the proximity sensor output on the proximity determination to cause the determination to be changed to a very close distance or touching proximity P1 range (e.g., more representative of the actual proximity). It can be appreciated that this process allows for conservation or reduction of use of power or battery energy consumed by the device by turning off a display backlight or changing other device settings.

The change in the output levels can be a rate of change and/or an amount of change that is greater than or less than a threshold. A rate of change may be described as the rate of increase or decrease of the power level over time. In some cases, the change over time may be described by a mathematical derivative with respect time such as d(power)/d(time) for a selected period of time, or a slope of the power signal as charted on a graph over time. For example, the change may be a rapid (e.g., over a short period of time) or drastic (e.g., over a wide range of levels) change in the visible light or IR light as determined by one or more sensors, as described herein. Moreover, each sensor output may be compared to a rate of change or amount of change threshold to alter an effect of a proximity sensor output on control of a proximity determination. Thus, the ALS sensor output may be received by a portable device, processor, or software application as described herein which alters an effect of a proximity sensor output on control of a proximity determination in response to the ALS output signal level exceeding (e.g., by becoming greater than or less than) the threshold.

Figure 10A:
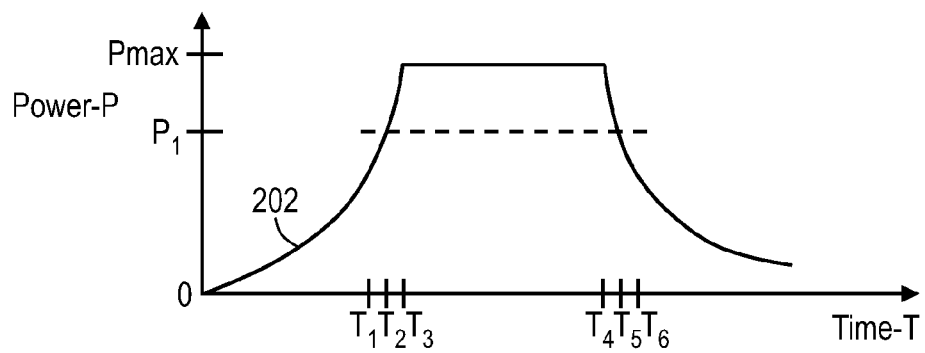
FIG. 10A is a graph showing an example of a proximity sensor output versus time.

FIG. 10A is a graph showing an example of a proximity sensor output versus time. FIG. 10A shows signal 202 with respect to power P versus time T. Signal 202 may be an output of a proximity sensor such as a power level of a signal based on or proportional too a level of IR light received by the proximity sensor from emitted IR light reflected by a normally or highly IR reflective object (e.g., a person's skin, neck or face). For instance, the proximity sensor may emit IR light using an emitter, a portion of the emitted IR light may be reflected by an object (e.g., see object 128, 888 and/or 988) and a portion of the light reflected by the object may be received by the proximity sensor which outputs power level signal 202 based on the received IR light. Power P may represent a signal power level or intensity output by the sensor, such as in Watts. Thus, signal 202 may represent a range of power between zero and Pmax (a maximum reflected IR light power for the object and closest possible actual proximity). The use of the term "range" may represent a range of values, power, or changes described herein. In some cases, a range may describe the relationship between a minimum and maximum power level range or rate of change of range and time.

FIG. 10A shows signal 202 increasing in power between time T1, T2, and T3; substantially level or stable between time T3 and T4; and decreasing over time between time T4, T5, and T6. At time T2, signal 202 is greater than or exceeds threshold P1. Similarly, at time T5, signal 202 is less than or becomes lower than threshold P1. Thus, a proximity determination may be made based on whether or not signal 202 is greater than threshold P1, such as to identify a proximity of an object for which the setting of a device will be altered, such as to turn off a backlight of a display or disable processing of inputs received at an input device. It is also considered that a setting of a device may be altered based on the rate of change of signal 202. For example, the rate of change of signal 202 over time between time T1 and T3 may exceed a threshold thus causing a setting of a device to be altered due to the increase in power level over time. Similarly, a setting of a device may be altered due to the decrease in power P over time between time T4 and T6. However, as noted above, depending on the IR light reflectiveness of the object reflecting the emitted IR light, power P may be attenuated or represent less light reflected by the object than for a more reflective object.

Figure 10B:
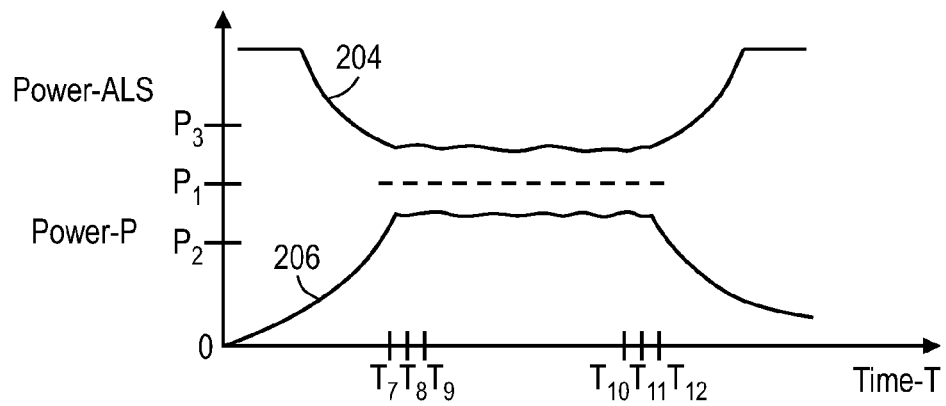
FIG. 10B is a graph showing examples of a proximity sensor output and a light sensor output versus time.

FIG. 10B is a graph showing examples of a proximity sensor output and a light sensor output versus time. FIG. 10B shows signal 206, with respect to power P versus time T. FIG. 10B shows signal 206 increasing in power between time T7, T8, and T9; substantially level or stable between time T9 and T10; and decreasing over time between time T10, T11, and T12. Signal 206 may be similar to signal 202 except that signal 206 is an output of a proximity sensor for a less IR reflective object than that for signal 202. For instance, signal 206 may be for a low or less than normally IR reflective object (e.g., a person's dark or grey hair). Thus, although the object reflecting the IR light for signal 202 and 206 may have the same proximity or be the same distance from the proximity sensor, signal 206 has a power level and rate of change attenuated or less than that for signal 202. For instance, signal 206 is not greater than, does not reach, or does not exceed threshold P1. However, signal 206 is greater than or exceeds threshold P2 between time T8 and time T11. Thus, a proximity determination may be made where signal 206 is greater than threshold P2, such as to determine a proximity of an object that is further away or not as approximate as an object which provides a proximity sensor output that exceeds threshold P1. Similarly, the rate of change of signal 206 between time T7 and T9 may exceed a threshold such as described above for signal 202 and time T1 and T3, but where the threshold for signal 206 is a lower change with respect to time. A similar concept applies for signal 206 and a rate of change between time T10 and T12, as compared to signal 202. Thus, signal 206 may be described as exceeding a power level or rate of change threshold between time T7 and T9, and between time T10 and T12, but not exceeding threshold P1 or a rate of change such as shown for signal 202 between time T1 and T3 and between time T4 and T6.

According to embodiments, when signal 206 exceeds a threshold between time T7 and T9 (or between time T10 and T12) but does not exceed another threshold (e.g., threshold P1 or a rate of change described for signal 202) the output of an ALS may be consulted, considered, or used to base a proximity determination. For instance, FIG. 10B shows signal 204, such as an output of an ALS received by a proximity sensor, device, microprocessor, or software application. Signal 204 is shown as power ALS with respect to time T. Power ALS may be described as a power level of a signal output by an ambient light sensor. For example, descriptions above with respect to power P may apply to power ALS, except where power ALS refers to output of an ambient light sensor responsive, based on, or proportional to ambient light incident upon the ambient light sensor, instead of IR light reflected by an object incident upon a proximity sensor. Signal 204 is shown decreasing between time T7 and T9, stable, level or at a minimum between time T9 and T10, and increasing between time T10 and T12. Signal 204 is less than or falls below threshold P3 between time T8 and time T11. Otherwise, signal 204 is greater than or above threshold P3.

Signal 204 may represent an ALS output for a sensor adjacent to, approximate to, or next to the sensor for which signal 206 is a proximity output. Thus, it can be appreciated that the changes, exceeding, being greater than, being less than threshold values (e.g., such as power level or rate of change threshold values) of signal 204 and signal 206 may occur simultaneously, contemporaneously, or having portions that overlap.

For example, signal 202 may represent a case where a proximity sensor adjacent to an earpiece of a portable device is held next to an object having a higher level of IR light reflectiveness. Thus, when signal 202 exceeds threshold P1 or a rate of change threshold, a setting of the device may be altered. However, signal 206 may be an output of a proximity sensor adjacent to an earpiece of a portable device sensing proximity of an object that has a low IR light reflectiveness or that is less reflective than the object for signal 202. Thus, although signal 206 exceeds threshold P2 for a rate of change threshold, it does not exceed threshold P1 or another rate of change. Hence, a proximity determination may be altered (automatically in some cases) based on signal 204, to change the proximity determination from that indicated by signal 206 to that indicated by signal 202 (e.g., that an object is in a proximity or distance range for a proximity sensor output that exceeds threshold P1 or a rate of change as described above for signal 202).

Figure 10C:
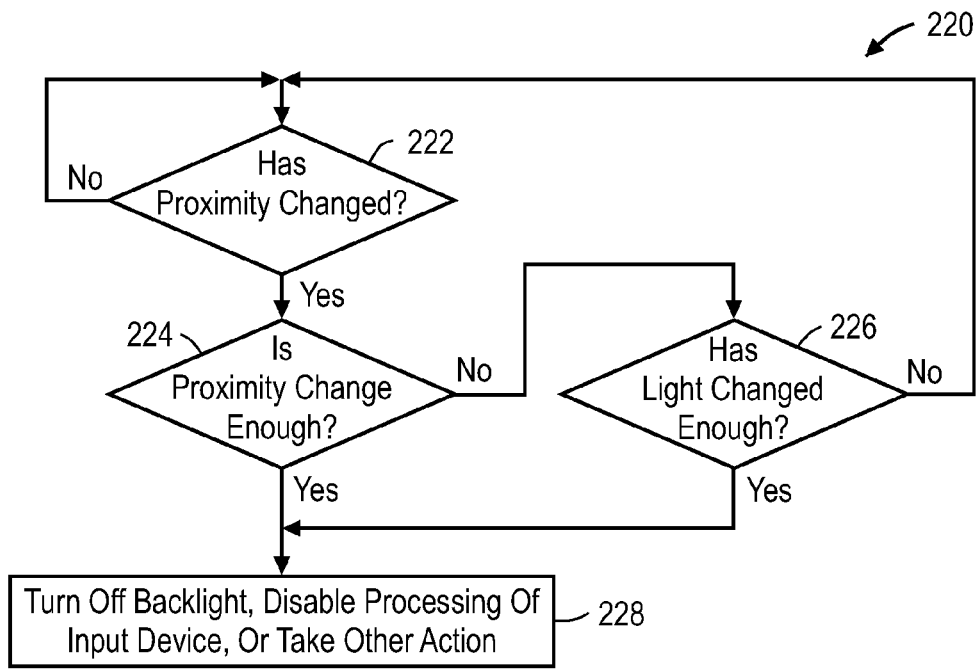
FIG. 10C is a flow chart of a method that includes turning off a backlight, disabling processing of inputs, or taking another action based on proximity and light sensor outputs in accordance with embodiments of the present invention.

FIG. 10C is a flow chart of a method that includes turning off a backlight, disabling processing of inputs, or taking another action based on proximity and light sensor outputs in accordance with embodiments of the present invention. FIG. 10C shows process 220, such as a process that may consider signals 206, 202 and 204. For example, at decision block 222 it is determined whether or not proximity has changed, such as based on signal 202 or 206. Block 222 may include determining signal 206 has exceeded threshold P2 or a rate of change threshold between time T7 and T9. If the proximity has not changed, processing returns to block 222. Alternatively, if the proximity has changed, processing continues to block 224.

At decision block 224 it is determined whether or not proximity has changed enough. For example, block 224 may include determining whether or not the proximity (e.g., signal 202 or 206) has exceeded threshold P1 or a rate of change described for signal 202 between time T1 and time T3. If the proximity has changed enough, processing continues to block 228. At block 228 a backlight is turned off, processing of an input device is disabled, or another action is taken.

Alternatively, if at block 224 proximity has not changed enough, processing continues to block 226. At decision block 226, it is determined whether or not light has changed enough. Block 226 may include determining whether signal 204 is less than threshold P3 or has a rate of change that is less than a threshold between time T7 and time T9. If at block 226 the light has not changed enough, processing returns to block 222. Alternatively, if at block 226 the light has changed enough, processing continues to block 228.

Thus, process 220 may be described as making a proximity determination that an object is not within a certain or selected proximity if the proximity sensor output does not exceed a first and second threshold, or if the proximity sensor output does not exceed a certain threshold and the ALS sensor does not exceed a certain threshold. Alternatively, it may describe making a proximity determination that an object is not within the selected proximity if the proximity sensor output exceeds a first threshold but the ALS sensor output does not exceed a threshold.

Figure 10D:
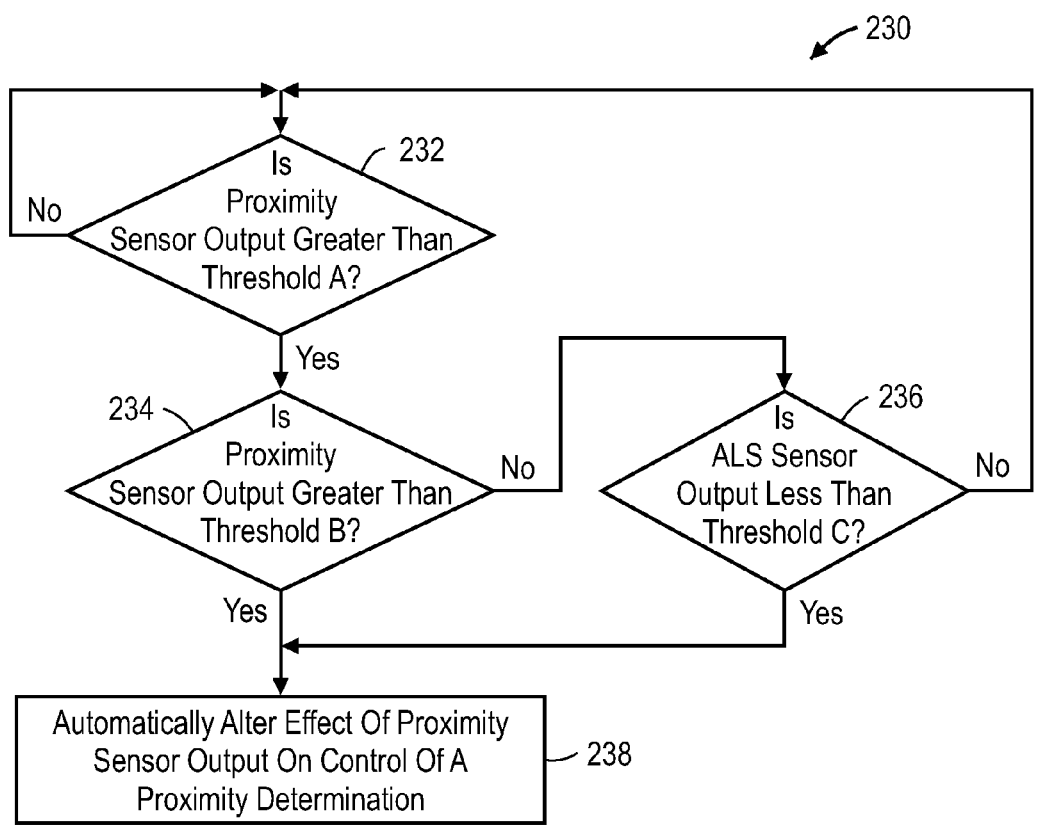
FIG. 10D is a flowchart of a method that includes altering an effect of a proximity sensor output on a proximity determination based on a proximity sensor output and an ambient light sensor output.

In another example, FIG. 10D is a flowchart of a method that includes altering an effect of a proximity sensor output on a proximity determination based on a proximity sensor output and an ambient light sensor output. FIG. 10D shows process 230, such as a process that may consider signals 206, 202 and 204. For example, at decision block 232 it is determined whether or not a proximity sensor output, such as based on signal 202 or 206, is greater than (e.g., exceeds) threshold A (e.g., a threshold indicating that a user actions, such as putting the device close to the user's head). Block 232 may include determining if a proximity sensor output power level or rate of change has exceeded threshold A. If the output has not exceeded threshold A, processing returns to block 232. Alternatively, if the output has exceeded threshold A, processing continues to block 234.

At decision block 234 it is determined whether or not a proximity sensor output (e.g., signal 202 or 206) is greater than threshold B (e.g., a threshold indicating that a user actions, such as putting the device up to or against the user's head or ear). For example, block 234 may include determining whether or not the proximity sensor output power level or rate of change has exceeded threshold B. If the proximity sensor output has exceeded threshold B, processing continues to block 238. At block 238 an effect of the proximity sensor output on control of a proximity determination is automatically altered (e.g., to change a proximity determination to an "actual proximity" determination). The determination may be altered automatically, such as by a device, a processor, and/or software.

In alternate embodiments, at block 238 an effect of the proximity sensor output on control of a proximity determination is non-automatically altered, such as by receiving a user selection to cause the alteration. For instance, upon determining that an alteration is to be made, the device, processor, and/or software may prompt the user to confirm or select the alteration. Upon receipt of the user confirmation or selection, the alteration occurs (e.g., it is optional until user selection).

Alternatively, if at block 234 the proximity sensor output has not exceeded threshold B, processing continues to block 236. At decision block 236, it is determined whether or not an ALS output, such as signal 204, is less than (e.g., below) threshold C. Block 236 may include determining whether an ALS sensor output power level or rate of change is below threshold C. If at block 236 the output is not low enough, processing returns to block 232. Alternatively, if at block 226 the output is low enough, processing continues to block 238.

Thus, process 220 may be described as (automatically in some cases) altering, setting or making a proximity determination of whether an object is not within a certain or selected proximity distance based on an ALS output.

Also, it is considered that all or a portion of the ALS output based on light (e.g., back light) emitted by a display of the device and reflected by the object into the ALS. In this case, the portion of light may be described as a "pedestal" and be subtracted (e.g., by processing logic, a processor, or software) from the ALS output prior to basing the altering of the proximity detection on the ALS output. It can be appreciated that in this case, the pedestal portion of the power output may increase simultaneously with increase in power level of the proximity sensor output, and with the decrease in the power level of the ALS output from blocking of the ALS sensor by the object.

According to embodiments, a proximity sensor (e.g., of a portable device) and/or a portable device may be "operated" by receiving an ambient light sensor (ALS) output (level); and altering, (automatically in some cases) based on the ALS output, an effect of a proximity sensor output on control of a proximity determination. For example, it can be appreciated that at least certain embodiments of the sensors described herein may output proximity and ALS data (e.g., output signals based on or proportional to received light levels) to a processor or software of an electronic device, a display device, a data processing device, or a data processing system. This may include sending proximity sensor output data (e.g., to detect a proximity of an object) and ALS output level or value data (e.g., to determine or identify an ambient light environment or level of visible light intensity) to a software application (e.g., instructions executing on a processor). Reference to a "device", an "electronic device", a "portable device", "a data processing system", a "date processing device" or a "system" herein may describe a portable device (such as a lap-top computer or device described for FIGS. 2-11), non-portable device (such as a desktop computer), or a processor or software application (e.g., instructions executed by a processor) of the device referred to. Thus, the software or processor can determine, based upon the data, whether to modify a setting of the device or data processing system. For instance, the processor, software or processing logic may compare the output data from a proximity sensor to a threshold value and/or compare the output data from one or more ALS to a threshold value to make a proximity determination (e.g., is an object within a proximity distance threshold or range). Specifically, the comparison may be used to determine when and by how much to modify (e.g., by adjusting, increasing, decreasing, turning on, turning off, or leaving status quo) at least one setting or display control parameter of a display illuminator or device (e.g., a backlight or input device) as described herein. For instance, the following descriptions, apply to proximity sensors and portable devices described herein.

Moreover, according to embodiments, a sensor output may represent the value or intensity for a plurality of ALS sensors. For example, the device, processor, or software application may receive a number of ambient light sensor output levels from a number of sensors. The multiple sensor outputs may be added together to represent a total ambient light falling on a location of the device. That total ambient light of the one or more sensors may be normalized to come up with a number from 0 to 1, with 1 representing full sunlight and 0 representing total darkness (e.g., and a lighted room between 1 and 0, with a brightly lit room above a softly or darkly lit room).

Ambient light level data may be provided by an ambient light sensor, which indicates the level of light intensity surrounding that sensor. Ambient light data may also be obtained from two or more ambient light sensors, which are disposed at different positions on, at, or adjacent to an earpiece of the device. Thus, an ALS sensor at or adjacent to an earpiece may best represent light falling directly on the earpiece. For example, see sensors 44, 62, 84 and 92 of FIGS. 2-5A respectively.

Also, according to embodiments, the output of the light sensor may be a value or level of ambient light (e.g., visible ambient light) sent by the sensor and received by a device, processor, or software application. For example, the light sensor "value" may be an ALS level, or output, such as a reading, electrical signal level or amplitude output by an ALS based on a level or intensity of ambient light received by or incident upon the ALS.

In some cases, the ALS level or output is a change in ALS level and the change causes the proximity determination to change.

In some embodiments, based on a received output and/or data acquired from one or more sensors, a digital processing system (e.g., a portable device) may (automatically in some cases) alter or change a setting of the system, such as according to an algorithm implemented by a software application. For instance, a system or device may have various device or feature settings, such as a display, display backlight, and user input processor or processing. These setting may includes those of a digital processing system, such as, for example, activating, deactivating, changing, controlling, and/or altering a setting (e.g., a parameter) of a backlight. Other responses that may be performed include changing a setting of, or disabling processing of inputs received at an input device. For example, altering a setting may include turning off the backlight of the portable device's display, suppressing the user's ability to input at the user interface (e.g., locking the input device), changing the telephone's mode, and the like. It will be appreciated that combinations of the above actions may also be implemented by the device, proximity sensor, processor, and/or software of the device, such as to both turn off a display's backlight and suppress the user's ability to input at a user interface.

Also, in some embodiments, the ALS sensor output may be used in connection with other sensor outputs, such as an accelerometer output, a blob sensor output, an irregular contacts output, a capacitive sensor output, a far-field recognition sensor output, and the like. Specifically, according to some embodiments, in addition to using an ALS output to more accurately determine "actual proximity", an accelerometer output, a blob sensor output, an irregular contacts output, a capacitive sensor output, a far field recognition sensor output power level or change in power level received from one or more of such sensors may be used, consulted, or a basis to operate a proximity sensor of a portable device by (automatically in some cases) setting, altering or changing a proximity determination.

In some cases, the effect of the proximity sensor output on the proximity determination may be altered, (automatically in some cases) based on an accelerometer output, such as where the output indicates that the device has accelerated, decelerated, or accelerated and then decelerated by an amount greater than a threshold amount. The accelerometer output may include or indicate strong movement recorded by an accelerometer, such as an accelerometer as known in the art.

Also, in some cases, the effect of the proximity sensor output on the proximity determination may be altered, (automatically in some cases) based on a blob detect output. The blob detect output may also be described as a "irregular contacts" output that detects irregular contacts that are larger than a fingertip (e.g. a whole ear, a face, a head, or a palm of a user). The "blob" may be contacts that have irregular (non-ellipsoid) shape or rough, ragged texture/topology. In some cases, the blob detect output may indicate or determine that the device is held in a hand and/or up to (e.g., touching, against, adjacent to, or hovering above) a face or head of a user. The determination may be altered based on the capacitive detection inputs of a number of simultaneous capacitive input detections to a plurality of input keys or locations of an input device, such as in an irregular location pattern or shape of the input detections. The blob detect sensor or irregular contacts sensor may include an input device (e.g., a multi-point touch screen), and associated processing logic and/or software. Additional information about such blob detect sensor or irregular contacts sensors and outputs can be found in U.S. patent application Ser. No. 11/619,464, filed Jan. 3, 2007 by Wayne C. Westerman, titled "Multi-Touch Input Discrimination"; and U.S. patent application Ser. No. 11/619,490, filed Jan. 3, 2007 by Wayne C. Westerman, titled "Irregular Input Identification", which are both incorporated herein by reference in their entireties.

Moreover, in some cases, the effect of the proximity sensor output on the proximity determination may be altered, (automatically in some cases) based on a far-field recognition output. The far-field recognition output may be an output to detect large objects (e.g. a face, a head, or a palm of a user) near the multitouch sensors via patch radii thresholding or farfield measurement techniques. In some cases, the far-field recognition output may indicate or determine that the device is held in a hand and/or up to (e.g., hovering above) a face or head of a user. The far-field recognition sensor may include an input device (e.g., a multi-point touch screen), and associated processing logic and/or software. Additional information about such far-field recognition sensors and outputs can be found in U.S. patent application Ser. No. 11/619,505, filed Jan. 3, 2007 by Wayne C. Westerman and Steve Hotelling, titled "Far-Field Input Identification" which is incorporated herein by reference in its entirety.

It can also be appreciated that the concepts described above for altering a proximity determination based on ALS output decrease in power level or rate of decrease of power level also apply to altering a proximity determination based on increase in power level or rate of increase of power level. For instance, when a power level or rate of change of power level of an ALS increases, such as to identify more ambient light incident upon the ALS, a backlight or input processing may be turned on or activated. The increase in power or change may indicate that the device is no longer held to the ear of the person.

Figure 11:
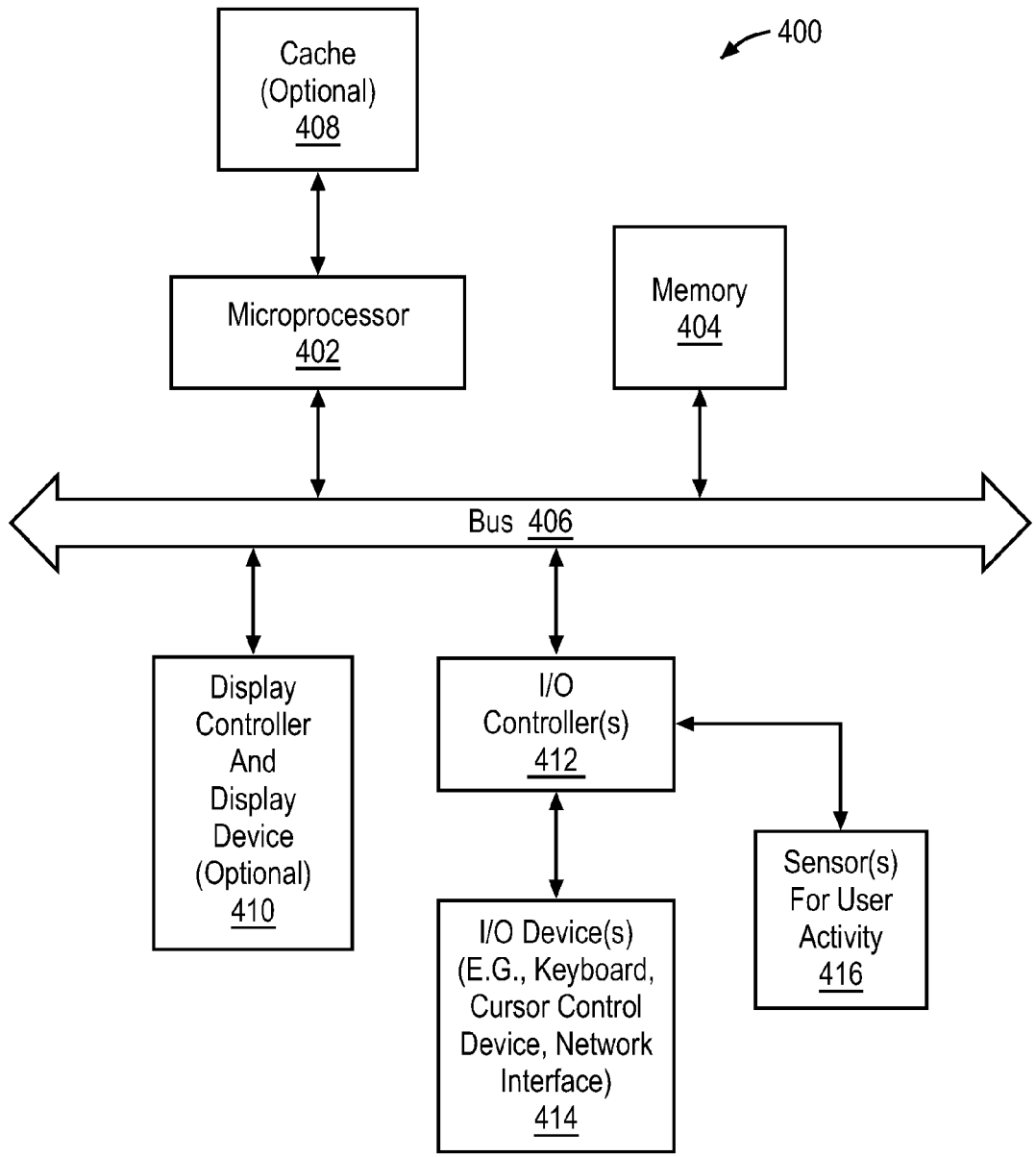
FIG. 11 is a block diagram of a digital processing system in accordance with one embodiment of the present invention.

FIG. 11 shows another example of a device according to an embodiment of the inventions. This device may include a processor, such as microprocessor 402, and a memory 404 (e.g., a storage device), which are coupled to each other through a bus 406. The device 400 may optionally include a cache 408 which is coupled to the microprocessor 402. This device may also optionally include a display controller and display device 410 which is coupled to the other components through the bus 406. One or more input/output controllers 412 are also coupled to the bus 406 to provide an interface for input/output devices 414 (e.g., user interface controls or input devices) and to provide an interface for one or more sensors 416 which are for sensing user activity. The bus 406 may include one or more buses connected to each other through various bridges, controllers, and/or adapters as is well known in the art. The input/output devices 414 may include a keypad or keyboard or a cursor control device such as a touch input panel. Furthermore, the input/output devices 414 may include a network interface which is either for a wired network or a wireless network (e.g. an RF transceiver). The sensors 416 may be any one of the sensors described herein including, for example, a proximity sensor or an ambient light sensor. In at least certain implementations of the device 400, the microprocessor 402 may receive data from one or more sensors 416 and may perform the analysis of that data in the manner described herein. For example, the data may be analyzed through an artificial intelligence process or in the other ways described herein. As a result of that analysis, the microprocessor 402 may then (automatically in some cases) cause an adjustment in one or more settings of the device.

Next, "control" of a proximity determination may describe augmenting setting, changing, effecting, determining, altering, or adjusting the proximity determination, proximity location, or proximity distance of an object to a proximity sensor. In some cases, controlling may describe augmenting a proximity sensor output using and ALS output to make a more accurate proximity determination.

Moreover, use of the term "effect" herein may describe changing a value, scalar or range determination of a proximity stored in a memory, logic, processing logic, register, or software, such as by multiplying, increasing, or pushing to the next value or range, the output signal or value of a proximity sensor. In some cases, "effect" may describe using software to apply a "gain" to an output of a sensor or photodiode.

Also, the term "automatically" may describe a cause and effect relationship, such as where something is altered, changed, or set without receiving a user input or action directed at the altered or changed result. For example, a received ALS output used for determining something other than for proximity determination, may also cause an additional change in a proximity determination (e.g., automatically) in addition to causing a determination of the other thing. In some cases, "automatically" may describe a result or determination that is a secondary result or in addition to a primary result or determination according to an ALS output. For instance, an output power level or change in power over time received from an ALS may not only cause a change in an ALS determination or reading (e.g., according to ALS output thresholds or criteria for the output), but may also cause an additional change in a proximity determination by altering (e.g., automatically) the effect of a proximity sensor output on the proximity determination.

According to some embodiments, the concepts described above (e.g., for FIGS. 1-11) may be implemented using a machine accessible medium containing instructions (e.g., such as storage device 104, memory 404, or executable program/software instructions stored thereon) that, when executed, cause a machine or processor (e.g., such as digital processing system 103, microprocessor 153, or processor 402) to perform (e.g., automatically or not) one or more actions. The actions may include the receiving, altering, controlling, generating, displaying, relating, processing, processes, and/or other actions, described herein, such as to operate a data processing system, portable device, electronic device, proximity sensor, display, display control parameter, backlight control parameter, input device, or user input as described herein.

Finally, it can be appreciated that the proximity sensor output (e.g., signal level or value), proximity determination, display setting, light sensor output (e.g., ALS output signal level or value), and/or device setting described herein may be stored in a machine accessible medium, such as a memory or data storage device (e.g., device 104, memory 404, system 103, processor 153, processor 402, and the like). In some cases, the stored values, selections, or levels, etc. noted above may be accessed by a device or processor to determine or calculate an actual proximity of an object to a proximity sensor, portable device, and/or earpiece.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of sensing proximity, the method comprising:
receiving a first intensity level output from a proximity sensor;
determining an estimated distance value between the proximity sensor and a surface of an object based on the received first intensity level output from the proximity sensor;
receiving a second intensity level output from an ambient light sensor (ALS);
determining, based on the second intensity level output from the ambient light sensor that the estimated distance value between the proximity sensor and the surface of the object is incorrect;
changing, by a data processing system, the estimated distance value using the second intensity level output from the ambient light sensor.

2. The method of claim 1, wherein the second intensity level output corresponds to a visible light level of ambient light received by an ALS sensor adjacent to a proximity sensor that provides the first intensity level output, and the ALS sensor and the proximity sensor are located adjacent to an earpiece of a portable device.

3. The method of claim 1, wherein changing the estimated distance value comprises changing the proximity of the object from a proximity greater than a first threshold to a proximity less than the first threshold.

4. The method of claim 3, wherein the first intensity level output is one of a power level and a rate of change of a power level of emitted IR light reflected by the surface of the object and received by the proximity sensor, and the second intensity level output is one of a power level and a rate of change of ambient light received by the ALS.

5. The method of claim 4, wherein the second intensity level output is a change in ALS intensity level and the change causes the estimated distance value change.

6. The method of claim 4, wherein the rate of change of second intensity level output exceeding the threshold occurs simultaneously with the rate of change of first intensity level output.

7. The method of claim 1, further comprising one of:
turning off a backlight of a display, automatically, based on the estimated distance value change, and disabling processing of inputs received at an input device, automatically based on the first intensity level output.

8. The method of claim 1, wherein the first intensity level output is a power level that exceeds a first threshold but does not exceed a second threshold, the second threshold determining a proximity of an object, wherein the second intensity level output is a rate of decrease of ambient light less than a third threshold.

9. The method of claim 8, wherein the first intensity level output of the proximity sensor output occurs simultaneously with the rate of change of the second intensity level output.

10. The method of claim 9 wherein a portion of the second intensity level output is light emitted by a display and reflected by the object into the ALS, and the portion is a value subtracted from the second intensity level output prior to basing the changing on the second intensity level output.

11. The method of claim 1, further comprising:
receiving an accelerometer output; and
wherein changing further comprises changing, automatically based on the accelerometer output, the effect of the first intensity level output on the estimated distance value.

12. The method of claim 11, wherein the accelerometer output comprises strong movement recorded by an accelerometer.

13. The method of claim 1, further comprising:
receiving a blob detect output; and
wherein changing further comprises changing, automatically based on the blob detect output, the effect of the first intensity level output on the estimated distance value.

14. The method of claim 13, wherein receiving blob detection output further comprises:
receiving a plurality of simultaneous capacitive input detections to a plurality of input locations of an input device; and
wherein changing further comprises changing, automatically based on the capacitive detection inputs, the effect of the first intensity level output on the estimated distance value.

15. The method of claim 14, wherein the blob detection comprises an irregular location pattern or shape of the plurality of input detections.

16. The method of claim 1, further comprising:
receiving a far-field recognition output; and
wherein changing further comprises changing, automatically based on the far-field recognition output, the effect of the first intensity level output on the estimated distance value.

17. The method of claim 1, further comprising changing a setting of one of a display of the portable device and an input device of the portable device, automatically based on the estimated distance value change.

18. The method of claim 17, wherein changing a setting further comprises one of:
turning off a backlight of a display and disabling processing of inputs received at an input device.

19. The method of claim 1, wherein the object is a low IR reflective object at a greater proximity than the estimated distance of the object, the second intensity level output is based on an actual proximity of the object to the ALS, and changing comprises changing the estimated distance value to be the actual proximity of the object.

20. The method of claim 19, wherein generating comprises generating a plurality of estimated distances that decrease over a period of time; wherein the object is moving towards the proximity sensor over the period of time; wherein receiving comprises receiving a plurality of second intensity level outputs that decrease over the period of time; and wherein the actual proximity of the object is closer than the corresponding estimated distance over the period of time.

21. The method of claim 19, further comprising:
generating a second estimated distance from a second first intensity level output of the proximity sensor detection of a second, high IR reflective object;
receiving a second intensity level output based on a second actual proximity of the second object to the ALS, wherein the second actual proximity is the same as the second estimated distance;
not changing, in response to the second intensity level output, the second estimated distance.

22. A non-transitory machine readable medium containing executable program instructions which when executed cause a method of operating a data processing system, the method comprising:
receiving a first intensity level output from a proximity sensor;
determining an estimated distance value between the proximity sensor and a surface of an object based on the received first intensity level output from the proximity sensor;
receiving a second intensity level output from an ambient light sensor;
determining, based on the second intensity level output from the ambient light sensor that the estimated distance value between the proximity sensor and the surface of the object is incorrect;
changing, by a data processing system, the estimated distance value using the second intensity level output from the ambient light sensor.

23. A portable data processing device comprising:
a means for receiving a first intensity level output from a proximity sensor;
a means for determining an estimated distance value between the proximity sensor and a surface of an object based on the received first intensity level output from the proximity sensor;
a means for receiving a second intensity level output from an ambient light sensor;
a means for determining, based on the second intensity level output from the ambient light sensor that the estimated distance value between the proximity sensor and the surface of the object is incorrect;
a means for changing, by a data processing system, the estimated distance value using the second intensity level output from the ambient light sensor.

24. A portable data processing device comprising:
hardware logic for:
receiving a first intensity level output from a proximity sensor;
determining an estimated distance value between the proximity sensor and a surface of an object based on the received first intensity level output from the proximity sensor;

receiving a second intensity level output from an ambient light sensor;

determining, based on the second intensity level output from the ambient light sensor that the estimated distance value between the proximity sensor and the surface of the object is incorrect;

changing, by a data processing system, the estimated distance value using the second intensity level output from the ambient light sensor.

* * * * *

UNITED STATES PATENT AND TRADEMARK OFFICE
CERTIFICATE OF CORRECTION

| | | |
|---|---|---|
| PATENT NO. | : 7,957,762 B2 | Page 1 of 1 |
| APPLICATION NO. | : 11/620702 | |
| DATED | : June 7, 2011 | |
| INVENTOR(S) | : Herz et al. | |

It is certified that error appears in the above-identified patent and that said Letters Patent is hereby corrected as shown below:

On Title page 2, in column 2, under "Other Publications", line 34-35, delete "www.unversalremote.com," and insert -- www.universalremote.com, --, therefor.

On Title page 2, in column 2, under "Other Publications", line 47, delete "Applicaiotn" and insert -- Application --, therefor.

In column 3, line 34, delete "through" and insert -- thorough --, therefor.

In column 9, line 42, delete "on or" and insert -- one or --, therefor.

In column 17, line 20, delete "too" and insert -- to --, therefor.

Signed and Sealed this
Twenty-ninth Day of November, 2011

David J. Kappos
*Director of the United States Patent and Trademark Office*